United States Patent
Candelore

(10) Patent No.: US 8,818,896 B2
(45) Date of Patent: Aug. 26, 2014

(54) SELECTIVE ENCRYPTION WITH COVERAGE ENCRYPTION

(75) Inventor: Brant L. Candelore, Escondido, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 963 days.

(21) Appl. No.: 11/097,919

(22) Filed: Apr. 1, 2005

(65) Prior Publication Data

US 2005/0192904 A1    Sep. 1, 2005

Related U.S. Application Data

(63) Continuation-in-part of application No. 10/318,782, filed on Dec. 13, 2002, now Pat. No. 7,120,250.

(60) Provisional application No. 60/409,675, filed on Sep. 9, 2002, provisional application No. 60/659,770, filed on Mar. 9, 2005.

(51) Int. Cl.
*G06Q 20/00* (2012.01)
*H04L 9/08* (2006.01)
*H04L 9/14* (2006.01)
*G06Q 20/12* (2012.01)

(52) U.S. Cl.
CPC ...... *G06Q 20/1235* (2013.01); *H04L 2209/603* (2013.01); *H04L 9/0861* (2013.01); *H04L 9/14* (2013.01)
USPC .............................................. 705/51; 726/26

(58) Field of Classification Search
USPC .......................................................... 705/51
See application file for complete search history.

(56) References Cited

U.S. PATENT DOCUMENTS

| 3,852,519 | A | 12/1974 | Court |
| 4,374,399 | A | 2/1983 | Ensinger |
| 4,381,519 | A | 4/1983 | Wilkinson et al. |

(Continued)

FOREIGN PATENT DOCUMENTS

| CA | 2389247 | 5/2001 |
| EP | 0471373 | 2/1992 |

(Continued)

OTHER PUBLICATIONS

"MPEG-2 Transmission," Dr. Gorry Fairhurst, Jan. 2001.

(Continued)

*Primary Examiner* — Calvin L Hewitt, II
*Assistant Examiner* — Zeshan Qayyum
(74) *Attorney, Agent, or Firm* — Miller Patent Services; Jerry A. Miller

(57) ABSTRACT

A method and apparatus for enabling use of multiple digital rights management scenarios (DRM). Unencrypted data representing digital content is examined to identify at least segments of content for DRM encryption. The identified segments of content are duplicated and then encrypted using a first encryption method associated with a first DRM to produce first encrypted segments. Duplicates are encrypted using a second encryption method associated with a second DRM to produce second encrypted segments. At least a portion of segments not selected for DRM encryption are encrypted using a coverage encryption method. The coverage encryption key is encrypted by each of a third and fourth encryption methods associated with the first and second DRMs respectively. This abstract is not to be considered limiting, since other embodiments may deviate from the features described in this abstract.

29 Claims, 8 Drawing Sheets

(56) References Cited

U.S. PATENT DOCUMENTS

| | | |
|---|---|---|
| 4,419,693 A | 12/1983 | Wilkinson |
| 4,521,853 A | 6/1985 | Guttag |
| 4,634,808 A | 1/1987 | Moerder |
| 4,700,387 A | 10/1987 | Hirata |
| 4,703,351 A | 10/1987 | Kondo |
| 4,703,352 A | 10/1987 | Kondo |
| 4,710,811 A | 12/1987 | Kondo |
| 4,712,238 A | 12/1987 | Gilhousen et al. |
| 4,722,003 A | 1/1988 | Kondo |
| 4,739,510 A | 4/1988 | Jeffers et al. |
| 4,772,947 A | 9/1988 | Kondo |
| 4,785,361 A | 11/1988 | Brotby |
| 4,788,589 A | 11/1988 | Kondo |
| 4,815,078 A | 3/1989 | Shimura |
| 4,845,560 A | 7/1989 | Kondo et al. |
| 4,887,296 A | 12/1989 | Horne |
| 4,890,161 A | 12/1989 | Kondo |
| 4,914,515 A | 4/1990 | Van Luyt |
| 4,924,310 A | 5/1990 | von Brandt |
| 4,944,006 A | 7/1990 | Citta et al. |
| 4,953,023 A | 8/1990 | Kondo |
| 4,964,126 A | 10/1990 | Musicus et al. |
| 4,989,245 A | 1/1991 | Bennett |
| 4,995,080 A | 2/1991 | Bestler et al. |
| 5,018,197 A | 5/1991 | Jones et al. |
| 5,023,710 A | 6/1991 | Kondo et al. |
| 5,091,936 A | 2/1992 | Katznelson |
| 5,122,873 A | 6/1992 | Golin |
| 5,138,659 A | 8/1992 | Kelkar et al. |
| 5,142,537 A | 8/1992 | Kutner et al. |
| 5,144,662 A | 9/1992 | Welmer |
| 5,144,664 A | 9/1992 | Esserman et al. |
| 5,151,782 A | 9/1992 | Ferraro |
| 5,159,452 A | 10/1992 | Kinoshita et al. |
| 5,159,633 A | 10/1992 | Nakamura |
| 5,195,135 A | 3/1993 | Palmer |
| 5,196,931 A | 3/1993 | Kondo |
| 5,208,816 A | 5/1993 | Seshardi et al. |
| 5,237,424 A | 8/1993 | Nishino et al. |
| 5,237,610 A | 8/1993 | Gammie et al. |
| 5,241,381 A | 8/1993 | Kondo |
| 5,247,575 A | 9/1993 | Sprague et al. |
| 5,258,835 A | 11/1993 | Kato |
| 5,319,707 A | 6/1994 | Wasilewski et al. |
| 5,319,712 A | 6/1994 | Finkelstein et al. |
| 5,325,432 A | 6/1994 | Gardeck et al. |
| 5,327,502 A | 7/1994 | Katata |
| 5,341,425 A | 8/1994 | Wasilewski et al. |
| 5,359,694 A | 10/1994 | Concordel |
| 5,379,072 A | 1/1995 | Kondo |
| 5,381,481 A | 1/1995 | Gammie et al. |
| 5,398,078 A | 3/1995 | Masuda et al. |
| 5,400,401 A | 3/1995 | Wasilewski et al. |
| 5,414,852 A | 5/1995 | Kramer et al. |
| 5,416,651 A | 5/1995 | Uetake et al. |
| 5,416,847 A | 5/1995 | Boze |
| 5,420,866 A | 5/1995 | Wasilewski |
| 5,428,403 A | 6/1995 | Andrew et al. |
| 5,434,716 A | 7/1995 | Sugiyama et al. |
| 5,438,369 A | 8/1995 | Citta et al. |
| 5,444,491 A | 8/1995 | Lim |
| 5,444,782 A | 8/1995 | Adams, Jr. et al. |
| 5,455,862 A | 10/1995 | Hoskinson |
| 5,469,216 A | 11/1995 | Takahashi et al. |
| 5,471,501 A | 11/1995 | Parr et al. |
| 5,473,692 A | 12/1995 | Davis |
| 5,477,263 A | 12/1995 | O'Callaghan et al. |
| 5,481,554 A | 1/1996 | Kondo |
| 5,481,627 A | 1/1996 | Kim |
| 5,485,577 A | 1/1996 | Eyer et al. |
| 5,491,748 A | 2/1996 | Auld, Jr. et al. |
| 5,515,107 A | 5/1996 | Chiang et al. |
| 5,526,427 A | 6/1996 | Thomas et al. |
| 5,528,608 A | 6/1996 | Shimizume |
| 5,535,276 A | 7/1996 | Ganesan |
| 5,539,823 A | 7/1996 | Martin |
| 5,539,828 A | 7/1996 | Davis |
| 5,553,141 A | 9/1996 | Lowry et al. |
| 5,555,305 A | 9/1996 | Robinson et al. |
| 5,561,713 A | 10/1996 | Suh |
| 5,568,552 A | 10/1996 | Davis |
| 5,574,787 A | 11/1996 | Ryan |
| 5,582,470 A | 12/1996 | Yu |
| 5,583,576 A | 12/1996 | Perlman et al. |
| 5,583,863 A | 12/1996 | Darr, Jr. et al. |
| 5,590,202 A | 12/1996 | Bestler et al. |
| 5,594,507 A | 1/1997 | Hoarty |
| 5,598,214 A | 1/1997 | Kondo et al. |
| 5,600,378 A | 2/1997 | Wasilewski |
| 5,600,721 A | 2/1997 | Kitazato |
| 5,606,359 A | 2/1997 | Youden et al. |
| 5,608,448 A | 3/1997 | Smoral et al. |
| 5,615,265 A | 3/1997 | Coutrot |
| 5,617,333 A | 4/1997 | Oyamada et al. |
| 5,625,715 A | 4/1997 | Trew et al. |
| 5,629,866 A | 5/1997 | Carrubba et al. |
| 5,629,981 A | 5/1997 | Nerlikar |
| 5,652,795 A | 7/1997 | Eillon et al. |
| 5,663,764 A | 9/1997 | Kondo et al. |
| 5,666,293 A | 9/1997 | Metz et al. |
| 5,696,906 A | 12/1997 | Peters et al. |
| 5,699,429 A | 12/1997 | Tamer et al. |
| 5,703,889 A | 12/1997 | Shimoda et al. |
| 5,717,814 A | 2/1998 | Abecassis |
| 5,726,702 A | 3/1998 | Hamaguchi et al. |
| 5,726,711 A | 3/1998 | Boyce |
| 5,732,346 A | 3/1998 | Lazaridis et al. |
| 5,742,680 A | 4/1998 | Wilson |
| 5,742,681 A | 4/1998 | Giachettie et al. |
| 5,751,280 A | 5/1998 | Abbott et al. |
| 5,751,743 A | 5/1998 | Takizawa |
| 5,751,813 A | 5/1998 | Dorenbos |
| 5,754,650 A | 5/1998 | Katznelson |
| 5,754,658 A | 5/1998 | Aucsmith |
| 5,757,417 A | 5/1998 | Aras et al. |
| 5,757,909 A | 5/1998 | Park |
| 5,761,180 A | 6/1998 | Murabayashi et al. |
| 5,768,539 A | 6/1998 | Metz et al. |
| 5,796,786 A | 8/1998 | Lee |
| 5,796,829 A | 8/1998 | Newby et al. |
| 5,796,840 A | 8/1998 | Davis |
| 5,802,176 A | 9/1998 | Audebert |
| 5,805,700 A | 9/1998 | Nardone et al. |
| 5,805,712 A | 9/1998 | Davis |
| 5,805,762 A | 9/1998 | Boyce et al. |
| 5,809,147 A | 9/1998 | De Lange et al. |
| 5,815,146 A | 9/1998 | Youden et al. |
| 5,818,934 A | 10/1998 | Cuccia |
| 5,825,879 A | 10/1998 | Davis |
| 5,835,668 A | 11/1998 | Yanagihara |
| 5,838,873 A | 11/1998 | Blatter et al. |
| 5,850,218 A | 12/1998 | LaJoie et al. |
| 5,852,290 A | 12/1998 | Chaney |
| 5,852,470 A | 12/1998 | Kondo et al. |
| 5,870,474 A | 2/1999 | Wasilewski et al. |
| 5,892,900 A * | 4/1999 | Ginter et al. .................. 726/26 |
| 5,894,320 A | 4/1999 | Vancelette |
| 5,894,516 A | 4/1999 | Brandenburg |
| 5,905,732 A | 5/1999 | Fimoff et al. |
| 5,915,018 A | 6/1999 | Aucsmith |
| 5,917,830 A | 6/1999 | Chen et al. |
| 5,920,625 A | 7/1999 | Davies |
| 5,920,626 A | 7/1999 | Durden et al. |
| 5,922,048 A | 7/1999 | Emura |
| 5,923,755 A | 7/1999 | Birch et al. |
| 5,926,624 A | 7/1999 | Katz et al. |
| 5,930,361 A | 7/1999 | Hayashi et al. |
| 5,933,498 A | 8/1999 | Schneck et al. |
| 5,933,500 A | 8/1999 | Blatter et al. |
| 5,940,738 A | 8/1999 | Rao |
| 5,943,605 A | 8/1999 | Koepele, Jr. |
| 5,949,877 A | 9/1999 | Traw et al. |
| 5,949,881 A | 9/1999 | Davis |
| 5,963,909 A | 10/1999 | Warren et al. |

(56) References Cited

U.S. PATENT DOCUMENTS

| | | |
|---|---|---|
| 5,968,197 A | 10/1999 | Doiron |
| 5,973,679 A | 10/1999 | Abbott et al. |
| 5,973,722 A | 10/1999 | Wakai et al. |
| 5,973,726 A | 10/1999 | Iijima et al. |
| 5,999,622 A | 12/1999 | Yasukawa et al. |
| 5,999,698 A | 12/1999 | Nakai et al. |
| 6,005,561 A | 12/1999 | Hawkins et al. |
| 6,005,940 A | 12/1999 | Kulinets |
| 6,011,849 A | 1/2000 | Orrin |
| 6,012,144 A | 1/2000 | Pickett |
| 6,016,348 A | 1/2000 | Blatter et al. |
| 6,021,199 A | 2/2000 | Ishibashi |
| 6,021,201 A | 2/2000 | Bakhle et al. |
| 6,026,164 A | 2/2000 | Sakamoto et al. |
| 6,028,932 A | 2/2000 | Park |
| 6,049,613 A | 4/2000 | Jakobsson |
| 6,055,314 A | 4/2000 | Spies et al. |
| 6,055,315 A | 4/2000 | Doyle et al. |
| 6,057,872 A | 5/2000 | Candelore |
| 6,058,186 A | 5/2000 | Enari |
| 6,058,192 A | 5/2000 | Guralnick et al. |
| 6,061,451 A | 5/2000 | Muratani et al. |
| 6,061,471 A | 5/2000 | Coleman |
| 6,064,676 A | 5/2000 | Slattery et al. |
| 6,064,748 A | 5/2000 | Hogan |
| 6,065,050 A | 5/2000 | DeMoney |
| 6,069,647 A | 5/2000 | Sullivan et al. |
| 6,070,245 A | 5/2000 | Murphy, Jr. et al. |
| 6,072,872 A | 6/2000 | Chang et al. |
| 6,072,873 A | 6/2000 | Bewick |
| 6,073,122 A | 6/2000 | Wool |
| 6,088,450 A | 7/2000 | Davis et al. |
| 6,105,134 A | 8/2000 | Pinder et al. |
| 6,108,422 A | 8/2000 | Newby et al. |
| 6,115,821 A | 9/2000 | Newby et al. |
| 6,118,873 A | 9/2000 | Lotspiech et al. |
| 6,134,237 A | 10/2000 | Brailean et al. |
| 6,134,551 A | 10/2000 | Aucsmith |
| 6,138,237 A | 10/2000 | Ruben et al. |
| 6,148,082 A | 11/2000 | Slattery et al. |
| 6,148,205 A | 11/2000 | Cotton |
| 6,154,206 A | 11/2000 | Ludtke |
| 6,157,719 A | 12/2000 | Wasilewski et al. |
| 6,181,334 B1 | 1/2001 | Freeman et al. |
| 6,181,364 B1 | 1/2001 | Ford |
| 6,185,369 B1 | 2/2001 | Ko et al. |
| 6,185,546 B1 | 2/2001 | Davis |
| 6,189,096 B1 | 2/2001 | Haverty |
| 6,192,131 B1 | 2/2001 | Geer et al. |
| 6,199,053 B1 | 3/2001 | Herbert et al. |
| 6,201,927 B1 | 3/2001 | Comer |
| 6,204,843 B1 | 3/2001 | Freeman et al. |
| 6,209,098 B1 | 3/2001 | Davis |
| 6,215,484 B1 | 4/2001 | Freeman et al. |
| 6,219,358 B1 | 4/2001 | Pinder et al. |
| 6,222,924 B1 | 4/2001 | Salomaki |
| 6,223,290 B1 | 4/2001 | Larsen et al. |
| 6,226,618 B1 | 5/2001 | Downs |
| 6,229,895 B1 | 5/2001 | Son et al. |
| 6,230,194 B1 | 5/2001 | Frailong et al. |
| 6,230,266 B1 | 5/2001 | Perlman et al. |
| 6,236,727 B1 | 5/2001 | Ciacelli et al. |
| 6,240,553 B1 | 5/2001 | Son et al. |
| 6,246,720 B1 | 6/2001 | Kutner et al. |
| 6,256,747 B1 | 7/2001 | Inohara et al. |
| 6,263,506 B1 | 7/2001 | Ezaki et al. |
| 6,266,416 B1 | 7/2001 | Sigbjornsen et al. |
| 6,266,480 B1 | 7/2001 | Ezaki et al. |
| 6,272,538 B1 | 8/2001 | Holden et al. |
| 6,278,783 B1 | 8/2001 | Kocher et al. |
| 6,289,455 B1 | 9/2001 | Kocher et al. |
| 6,292,568 B1 | 9/2001 | Atkins, III et al. |
| 6,292,892 B1 | 9/2001 | Davis |
| 6,307,939 B1 | 10/2001 | Vigarie |
| 6,311,012 B1 | 10/2001 | Cho et al. |
| 6,314,111 B1 | 11/2001 | Nandikonda et al. |
| 6,314,188 B1 | 11/2001 | Ishibashi |
| 6,314,409 B2 | 11/2001 | Schneck et al. |
| 6,323,914 B1 | 11/2001 | Linzer |
| 6,324,288 B1 | 11/2001 | Hoffman |
| 6,327,421 B1 | 12/2001 | Tiwari et al. |
| 6,337,947 B1 | 1/2002 | Porter et al. |
| 6,351,538 B1 | 2/2002 | Uz |
| 6,351,813 B1 | 2/2002 | Mooney et al. |
| 6,377,589 B1 | 4/2002 | Knight et al. |
| 6,378,130 B1 | 4/2002 | Adams |
| 6,389,533 B1 | 5/2002 | Davis et al. |
| 6,389,537 B1 | 5/2002 | Davis et al. |
| 6,415,031 B1 | 7/2002 | Colligan et al. |
| 6,415,101 B1 | 7/2002 | deCarmo et al. |
| 6,418,169 B1 | 7/2002 | Datari |
| 6,424,717 B1 | 7/2002 | Pinder et al. |
| 6,430,361 B2 | 8/2002 | Lee |
| 6,445,738 B1 | 9/2002 | Zdepski et al. |
| 6,449,718 B1 | 9/2002 | Rucklidge et al. |
| 6,452,923 B1 | 9/2002 | Gerszberg et al. |
| 6,453,115 B1 | 9/2002 | Boyle |
| 6,453,116 B1 | 9/2002 | Ando et al. |
| 6,456,985 B1 | 9/2002 | Ohtsuka |
| 6,459,427 B1 | 10/2002 | Mao et al. |
| 6,463,152 B1 | 10/2002 | Takahashi |
| 6,463,445 B1 | 10/2002 | Suzuki et al. |
| 6,466,671 B1 | 10/2002 | Maillard et al. |
| 6,473,459 B1 | 10/2002 | Sugano et al. |
| 6,480,551 B1 | 11/2002 | Ohishi et al. |
| 6,490,728 B1 | 12/2002 | Kitazato et al. |
| 6,505,032 B1 | 1/2003 | McCorkle et al. |
| 6,505,299 B1 | 1/2003 | Zeng et al. |
| 6,510,554 B1 | 1/2003 | Gorden et al. |
| 6,519,693 B1 | 2/2003 | Debey |
| 6,526,144 B2 | 2/2003 | Markandey et al. |
| 6,529,526 B1 | 3/2003 | Schneidewend |
| 6,543,053 B1 | 4/2003 | Li et al. |
| 6,549,229 B1 | 4/2003 | Kirby et al. |
| 6,550,008 B1 | 4/2003 | Zhang et al. |
| 6,557,031 B1 | 4/2003 | Mimura et al. |
| 6,587,561 B1 | 7/2003 | Sered et al. |
| 6,590,979 B1 | 7/2003 | Ryan |
| 6,615,039 B1 | 9/2003 | Eldering |
| 6,621,979 B1 | 9/2003 | Eerenberg et al. |
| 6,640,145 B2 | 10/2003 | Hoffberg et al. |
| 6,640,305 B2 | 10/2003 | Kocher et al. |
| 6,643,298 B1 | 11/2003 | Brunheroto et al. |
| 6,650,754 B2 | 11/2003 | Akiyama et al. |
| 6,654,389 B1 | 11/2003 | Brunheroto et al. |
| 6,678,740 B1 | 1/2004 | Rakib et al. |
| 6,681,326 B2 | 1/2004 | Son et al. |
| 6,684,250 B2 | 1/2004 | Anderson et al. |
| 6,697,489 B1 | 2/2004 | Candelore |
| 6,697,944 B1 | 2/2004 | Jones et al. |
| 6,701,258 B2 | 3/2004 | Kramb et al. |
| 6,704,733 B2 * | 3/2004 | Clark et al. ..................... 707/10 |
| 6,707,696 B1 | 3/2004 | Turner et al. |
| 6,714,650 B1 | 3/2004 | Maillard et al. |
| 6,718,551 B1 | 4/2004 | Swix et al. |
| 6,735,311 B1 | 5/2004 | Rump et al. |
| 6,738,394 B1 | 5/2004 | Kreuzgruber et al. |
| 6,741,795 B1 | 5/2004 | Takehiko et al. |
| 6,754,276 B1 | 6/2004 | Harumoto et al. |
| 6,772,340 B1 | 8/2004 | Peinado et al. |
| 6,788,690 B2 | 9/2004 | Harri |
| 6,788,882 B1 | 9/2004 | Geer et al. |
| 6,820,277 B1 | 11/2004 | Eldering et al. |
| 6,826,185 B1 | 11/2004 | Montanaro et al. |
| 6,853,728 B1 | 2/2005 | Kahn et al. |
| 6,859,535 B1 | 2/2005 | Tatebayashi et al. |
| 6,883,050 B1 | 4/2005 | Safadi |
| 6,891,565 B1 | 5/2005 | Dietrich |
| 6,895,128 B2 | 5/2005 | Bohnenkamp |
| 6,904,520 B1 | 6/2005 | Rosset et al. |
| 6,917,684 B1 | 7/2005 | Tatebayashi et al. |
| 6,922,785 B1 | 7/2005 | Brewer et al. |
| 6,925,180 B2 | 8/2005 | Iwamura |
| 6,938,162 B1 | 8/2005 | Nagai et al. |

(56) References Cited

U.S. PATENT DOCUMENTS

| | | | |
|---|---|---|---|
| 6,973,187 B2 * | 12/2005 | Gligor et al. | 380/28 |
| 6,976,166 B2 | 12/2005 | Herley et al. | |
| 6,988,238 B1 | 1/2006 | Kovacevic et al. | |
| 7,023,924 B1 | 4/2006 | Keller et al. | |
| 7,039,802 B1 | 5/2006 | Eskicioglu et al. | |
| 7,039,938 B2 | 5/2006 | Candelore | |
| 7,055,166 B1 | 5/2006 | Logan et al. | |
| 7,065,213 B2 | 6/2006 | Pinder | |
| 7,079,752 B1 | 7/2006 | Leyendecker | |
| 7,089,579 B1 | 8/2006 | Mao et al. | |
| 7,096,481 B1 | 8/2006 | Forecast et al. | |
| 7,096,487 B1 | 8/2006 | Gordon et al. | |
| 7,100,183 B2 | 8/2006 | Kunkel et al. | |
| 7,110,659 B2 | 9/2006 | Fujie et al. | |
| 7,120,250 B2 | 10/2006 | Candelore | |
| 7,124,303 B2 | 10/2006 | Candelore | |
| 7,127,619 B2 | 10/2006 | Unger et al. | |
| 7,139,398 B2 | 11/2006 | Candelore et al. | |
| 7,146,007 B1 | 12/2006 | Maruo et al. | |
| 7,151,831 B2 | 12/2006 | Candelore et al. | |
| 7,151,833 B2 | 12/2006 | Candelore et al. | |
| 7,155,012 B2 | 12/2006 | Candelore et al. | |
| 7,158,185 B2 | 1/2007 | Gastaldi | |
| 7,194,192 B2 | 3/2007 | Ko et al. | |
| 7,194,758 B1 | 3/2007 | Waki et al. | |
| 7,221,706 B2 | 5/2007 | Zhao et al. | |
| 7,292,692 B2 | 11/2007 | Bonan et al. | |
| 7,298,959 B1 | 11/2007 | Hallberg et al. | |
| 7,336,785 B1 | 2/2008 | Lu et al. | |
| 7,391,866 B2 | 6/2008 | Fukami et al. | |
| 7,490,236 B2 | 2/2009 | Wasilewski | |
| 7,490,344 B2 | 2/2009 | Haberman et al. | |
| 7,496,198 B2 | 2/2009 | Pinder et al. | |
| 7,500,258 B1 | 3/2009 | Eldering | |
| 7,555,123 B2 | 6/2009 | Pinder et al. | |
| 7,984,466 B2 | 7/2011 | Eldering et al. | |
| 2001/0013123 A1 | 8/2001 | Freeman et al. | |
| 2001/0017885 A1 | 8/2001 | Asai et al. | |
| 2001/0024471 A1 | 9/2001 | Bordes et al. | |
| 2001/0030959 A1 | 10/2001 | Ozawa et al. | |
| 2001/0036271 A1 | 11/2001 | Javed | |
| 2001/0051007 A1 | 12/2001 | Teshima | |
| 2002/0003881 A1 | 1/2002 | Reitmeier et al. | |
| 2002/0021805 A1 | 2/2002 | Schumann et al. | |
| 2002/0023013 A1 * | 2/2002 | Hughes et al. | 705/26 |
| 2002/0026478 A1 * | 2/2002 | Rodgers et al. | 709/205 |
| 2002/0026587 A1 | 2/2002 | Talstra et al. | |
| 2002/0036717 A1 | 3/2002 | Abiko et al. | |
| 2002/0044558 A1 | 4/2002 | Gobbi et al. | |
| 2002/0046406 A1 | 4/2002 | Chelehmal et al. | |
| 2002/0047915 A1 | 4/2002 | Misu | |
| 2002/0059425 A1 | 5/2002 | Belfiore et al. | |
| 2002/0065678 A1 | 5/2002 | Peliotis et al. | |
| 2002/0066101 A1 | 5/2002 | Gordon et al. | |
| 2002/0067436 A1 | 6/2002 | Shirahama et al. | |
| 2002/0083317 A1 | 6/2002 | Ohta et al. | |
| 2002/0083438 A1 | 6/2002 | So et al. | |
| 2002/0083439 A1 | 6/2002 | Eldering | |
| 2002/0097322 A1 | 7/2002 | Monroe et al. | |
| 2002/0100054 A1 | 7/2002 | Feinberg et al. | |
| 2002/0108035 A1 | 8/2002 | Herley et al. | |
| 2002/0109707 A1 | 8/2002 | Lao et al. | |
| 2002/0116705 A1 | 8/2002 | Perlman et al. | |
| 2002/0126890 A1 | 9/2002 | Katayama et al. | |
| 2002/0129243 A1 | 9/2002 | Nanjundiah | |
| 2002/0144116 A1 | 10/2002 | Giobbi | |
| 2002/0144260 A1 | 10/2002 | Devara | |
| 2002/0150239 A1 | 10/2002 | Carny et al. | |
| 2002/0157115 A1 | 10/2002 | Lu | |
| 2002/0164022 A1 | 11/2002 | Strasser et al. | |
| 2002/0170053 A1 | 11/2002 | Peterka et al. | |
| 2002/0184506 A1 | 12/2002 | Perlman | |
| 2002/0194589 A1 | 12/2002 | Cristofalo et al. | |
| 2002/0194613 A1 | 12/2002 | Unger | |
| 2002/0196850 A1 | 12/2002 | Liu et al. | |
| 2002/0196939 A1 | 12/2002 | Unger et al. | |
| 2003/0002854 A1 | 1/2003 | Belknap et al. | |
| 2003/0009669 A1 | 1/2003 | White et al. | |
| 2003/0012286 A1 | 1/2003 | Ishtiaq et al. | |
| 2003/0021412 A1 | 1/2003 | Candelore et al. | |
| 2003/0026423 A1 | 2/2003 | Unger et al. | |
| 2003/0026432 A1 | 2/2003 | Woodward | |
| 2003/0026523 A1 | 2/2003 | Unger et al. | |
| 2003/0028879 A1 | 2/2003 | Gordon et al. | |
| 2003/0034997 A1 | 2/2003 | McKain et al. | |
| 2003/0035482 A1 | 2/2003 | Klompenhouwer et al. | |
| 2003/0035540 A1 | 2/2003 | Freeman et al. | |
| 2003/0035543 A1 | 2/2003 | Gillon | |
| 2003/0046686 A1 | 3/2003 | Candelore et al. | |
| 2003/0046687 A1 | 3/2003 | Hodges et al. | |
| 2003/0059047 A1 | 3/2003 | Iwamura | |
| 2003/0063615 A1 | 4/2003 | Luoma et al. | |
| 2003/0072555 A1 | 4/2003 | Yap et al. | |
| 2003/0077071 A1 | 4/2003 | Lin et al. | |
| 2003/0079133 A1 | 4/2003 | Breiter et al. | |
| 2003/0081630 A1 | 5/2003 | Mowery et al. | |
| 2003/0081776 A1 | 5/2003 | Candelore | |
| 2003/0084284 A1 | 5/2003 | Ando et al. | |
| 2003/0097662 A1 | 5/2003 | Russ et al. | |
| 2003/0108199 A1 | 6/2003 | Pinder et al. | |
| 2003/0112333 A1 | 6/2003 | Chen et al. | |
| 2003/0118243 A1 | 6/2003 | Sezer et al. | |
| 2003/0123664 A1 | 7/2003 | Pedlow et al. | |
| 2003/0123849 A1 | 7/2003 | Nallur et al. | |
| 2003/0126086 A1 * | 7/2003 | Safadi | 705/51 |
| 2003/0133570 A1 | 7/2003 | Candelore et al. | |
| 2003/0140257 A1 | 7/2003 | Peterka et al. | |
| 2003/0145329 A1 | 7/2003 | Candelore | |
| 2003/0152224 A1 | 8/2003 | Candelore et al. | |
| 2003/0152226 A1 | 8/2003 | Candelore et al. | |
| 2003/0152232 A1 | 8/2003 | Pirila et al. | |
| 2003/0156718 A1 | 8/2003 | Candelore et al. | |
| 2003/0159139 A1 | 8/2003 | Candelore et al. | |
| 2003/0159140 A1 | 8/2003 | Candelore | |
| 2003/0159152 A1 | 8/2003 | Lin et al. | |
| 2003/0174837 A1 | 9/2003 | Candelore et al. | |
| 2003/0174844 A1 | 9/2003 | Candelore | |
| 2003/0188154 A1 | 10/2003 | Dallard | |
| 2003/0188164 A1 | 10/2003 | Okimoto et al. | |
| 2003/0190054 A1 | 10/2003 | Troyansky et al. | |
| 2003/0193973 A1 | 10/2003 | Takashimizu et al. | |
| 2003/0198223 A1 | 10/2003 | Mack et al. | |
| 2003/0204717 A1 | 10/2003 | Kuehnel | |
| 2003/0222994 A1 | 12/2003 | Dawson | |
| 2003/0226149 A1 | 12/2003 | Chun et al. | |
| 2003/0228018 A1 | 12/2003 | Vince | |
| 2004/0003008 A1 | 1/2004 | Wasilewski et al. | |
| 2004/0003281 A1 | 1/2004 | Sonoda et al. | |
| 2004/0010717 A1 | 1/2004 | Simec et al. | |
| 2004/0021764 A1 | 2/2004 | Driscoll, Jr. et al. | |
| 2004/0028227 A1 | 2/2004 | Yu | |
| 2004/0037421 A1 | 2/2004 | Truman | |
| 2004/0047470 A1 | 3/2004 | Candelore | |
| 2004/0049688 A1 | 3/2004 | Candelore et al. | |
| 2004/0049690 A1 | 3/2004 | Candelore et al. | |
| 2004/0049691 A1 | 3/2004 | Candelore et al. | |
| 2004/0049694 A1 | 3/2004 | Candelore | |
| 2004/0064688 A1 | 4/2004 | Jacobs | |
| 2004/0068659 A1 | 4/2004 | Diehl | |
| 2004/0073917 A1 | 4/2004 | Pedlow, Jr. et al. | |
| 2004/0078338 A1 | 4/2004 | Ohta et al. | |
| 2004/0078575 A1 | 4/2004 | Morten et al. | |
| 2004/0081333 A1 | 4/2004 | Grab et al. | |
| 2004/0083117 A1 | 4/2004 | Chen et al. | |
| 2004/0086127 A1 | 5/2004 | Candelore | |
| 2004/0088552 A1 | 5/2004 | Candelore | |
| 2004/0088558 A1 | 5/2004 | Candelore et al. | |
| 2004/0091109 A1 | 5/2004 | Son et al. | |
| 2004/0100510 A1 | 5/2004 | Milic-Frayling et al. | |
| 2004/0123094 A1 | 6/2004 | Sprunk | |
| 2004/0136532 A1 | 7/2004 | Pinder et al. | |
| 2004/0139337 A1 | 7/2004 | Pinder et al. | |
| 2004/0151314 A1 | 8/2004 | Candelore | |
| 2004/0158721 A1 | 8/2004 | Candelore | |

(56) References Cited

U.S. PATENT DOCUMENTS

| | | |
|---|---|---|
| 2004/0165586 A1 | 8/2004 | Read et al. |
| 2004/0168121 A1 | 8/2004 | Matz |
| 2004/0172650 A1 | 9/2004 | Hawkins et al. |
| 2004/0181666 A1 | 9/2004 | Candelore |
| 2004/0187161 A1 | 9/2004 | Cao |
| 2004/0193550 A1 | 9/2004 | Siegal |
| 2004/0240668 A1 | 12/2004 | Bonan et al. |
| 2004/0247122 A1 | 12/2004 | Hobrock et al. |
| 2004/0261099 A1 | 12/2004 | Durden et al. |
| 2004/0264924 A1 | 12/2004 | Campisano et al. |
| 2004/0267602 A1 | 12/2004 | Gaydos et al. |
| 2005/0004875 A1 | 1/2005 | Kontio et al. |
| 2005/0015816 A1 | 1/2005 | Christofalo et al. |
| 2005/0028193 A1 | 2/2005 | Candelore et al. |
| 2005/0036067 A1 | 2/2005 | Ryal et al. |
| 2005/0063541 A1 | 3/2005 | Candelore |
| 2005/0066357 A1 | 3/2005 | Ryal |
| 2005/0071669 A1 | 3/2005 | Medvinsky et al. |
| 2005/0094808 A1 | 5/2005 | Pedlow, Jr. et al. |
| 2005/0094809 A1 | 5/2005 | Pedlow, Jr. et al. |
| 2005/0097596 A1 | 5/2005 | Pedlow, Jr. |
| 2005/0097597 A1 | 5/2005 | Pedlow, Jr. et al. |
| 2005/0097598 A1 | 5/2005 | Pedlow, Jr. et al. |
| 2005/0097614 A1 | 5/2005 | Pedlow, Jr. et al. |
| 2005/0102702 A1 | 5/2005 | Candelore et al. |
| 2005/0129233 A1 | 6/2005 | Pedlow, Jr. |
| 2005/0141713 A1 | 6/2005 | Genevois |
| 2005/0169473 A1 | 8/2005 | Candelore |
| 2005/0172127 A1 | 8/2005 | Hartung et al. |
| 2005/0192904 A1 | 9/2005 | Candelore |
| 2005/0198586 A1 | 9/2005 | Sekiguchi et al. |
| 2005/0228752 A1 | 10/2005 | Konetski et al. |
| 2005/0259813 A1 | 11/2005 | Wasilewski et al. |
| 2005/0265547 A1 | 12/2005 | Strasser et al. |
| 2005/0271205 A1 | 12/2005 | Shen et al. |
| 2005/0283797 A1 | 12/2005 | Eldering et al. |
| 2006/0036554 A1 | 2/2006 | Schrock et al. |
| 2006/0115083 A1 | 6/2006 | Candelore et al. |
| 2006/0130119 A1 | 6/2006 | Candelore et al. |
| 2006/0130121 A1 | 6/2006 | Candelore et al. |
| 2006/0136976 A1 | 6/2006 | Coupe et al. |
| 2006/0153379 A1 | 7/2006 | Candelore et al. |
| 2006/0168616 A1 | 7/2006 | Candelore |
| 2006/0174264 A1 | 8/2006 | Candelore |
| 2006/0262926 A1 | 11/2006 | Candelore et al. |
| 2006/0269060 A1 | 11/2006 | Candelore et al. |
| 2007/0006253 A1 | 1/2007 | Pinder et al. |
| 2007/0091886 A1 | 4/2007 | Davis et al. |
| 2007/0100701 A1 | 5/2007 | Boccon-Gibod et al. |
| 2009/0210698 A1 | 8/2009 | Candelore |

FOREIGN PATENT DOCUMENTS

| | | |
|---|---|---|
| EP | 0527611 | 7/1992 |
| EP | 0558016 | 2/1993 |
| EP | 0596826 | 4/1993 |
| EP | 0610587 | 12/1993 |
| EP | 0680209 | 4/1995 |
| EP | 0 696 141 | 7/1995 |
| EP | 0674440 | 9/1995 |
| EP | 0674441 | 9/1995 |
| EP | 0720374 | 7/1996 |
| EP | 0382764 | 4/1997 |
| EP | 0833517 | 4/1998 |
| EP | 0866615 | 9/1998 |
| EP | 0 926 894 | 6/1999 |
| EP | 1187483 | 3/2002 |
| JP | 61-264371 | 11/1986 |
| JP | 07-046575 | 2/1995 |
| JP | 7067028 | 3/1995 |
| JP | 09-251714 | 9/1997 |
| JP | 10-336624 | 12/1998 |
| JP | 2000-125260 | 4/2000 |
| JP | 2001-69480 | 3/2001 |
| JP | 2001-117809 | 4/2001 |
| JP | 2001-242786 | 9/2001 |
| JP | 11243534 | 10/2002 |
| JP | 2003-122710 | 4/2003 |
| KR | 2001-0093609 | 10/2001 |
| KR | 299634 | 8/2008 |
| WO | WO 86/07224 | 12/1986 |
| WO | WO 93/09525 | 5/1993 |
| WO | WO 94/10775 | 5/1994 |
| WO | WO 94/13081 | 6/1994 |
| WO | WO 94/13107 | 6/1994 |
| WO | WO 95/28058 | 4/1995 |
| WO | WO 97/38530 | 10/1997 |
| WO | WO 97/46009 | 12/1997 |
| WO | WO 98/08341 | 2/1998 |
| WO | WO 00/31964 | 6/2000 |
| WO | WO 00/59203 | 10/2000 |
| WO | WO 00/60846 | 10/2000 |
| WO | WO 00/64164 | 10/2000 |
| WO | WO 00/70817 | 11/2000 |
| WO | WO 01/26372 | 4/2001 |
| WO | WO 01/35669 | 5/2001 |
| WO | WO 01/65762 | 9/2001 |
| WO | WO 01/67667 | 9/2001 |
| WO | WO 01/78386 | 10/2001 |
| WO | WO 02/51096 | 6/2002 |

OTHER PUBLICATIONS

"How Networks Work" Derfler and Freed, Ziff-Davis Press, 1996.

"How Computers Work—Millennium Edition," Ron White, Que Corporation, 1999.

"How the Internet Works—Millennium Edition," Preston Gralla, Que Corporation, 1999.

"Desktop Encyclopedia of the Internet," Nathan J. Muller, Artech House, 1999.

"How Networks Work—Milennium Edition"—pp. 88-89, Que Corporation, 2000.

Microsoft Windows XP, Oct. 2001, Microsoft, Screen Shots and Help Files.

MPEG-2 Digital Broadcast Pocket Guide vol. 6, Copyright 201 Acterna, LLC.

"MPEG-2 Compliant Trick Play Over a Digital Interface," van Gassel et al., IEEE pp. 170-171., 2002.

Liu, et al. Motion Vector Encryption in Multimedia Streaming, 2004, IEEE, pp. 64-71.

"K-Time Encryption for K-Time Licensing," Perkins, et al., IEEE, 2002.

"Partial Encryption of Compressed Images and Videos," Howard Cheng et al. IEEE 2000.

"Secure Transmission of MPEG Video Sources," Teixeira et al., date unknown.

Anonymous—Functional Model of a Condtional Access System; EBU Project Group B/CA, EBU Review Technical, Winter No. 266, Grand-Saconnex, CH; pp. 64-77; 1995.

Perry et al, "Final Report of the Co-Chairs of the Broadcast Protection Discussion Subgroup to the Copy Protection Technical Working Group," Jun. 3, 2003.

Anonymous, Rehabilitation of Digital Television, CEATEC Japan 2003, Special Report, Jan. 2003. (Translation provided by Japanese associate).

Teixeira et al., Secure Transmission of MPEG Video Sources, Nov. 6, 1998 (Resubmitted with date provided by Wayback machine.).

Bungum, O.W., "Transmultiplexing, Transcontrol and Transscrambling of MPEG-2/DVB Signal," International Broadcasting Convention, Conference Publication No. 428, pp. 288-293, Sep. 1996.

Parviainen, Roland and Parnes, Peter, "Large Scale Distributed Watermarking of Multicast Media Through Encryption," 2001.

Japanese Office action in JP application 2012-154898, and translation thereof dated Dec. 16, 2013.

Alattar, A.M. et al., Improved selective encryption techniques for secure transmission of MPEG video bitstreams, Oct. 24, 1999, Digimarc Corp., Lake Oswego, OR, USA, IEEE, pp. 256-260.

(56) References Cited

OTHER PUBLICATIONS

Kunkelmann T. et al., A scalable security architecture for multimedia communication standards, Darmstard Univ. of Technology, ITO, Germany, 1997, pp. 660-661.
Yip, Kun-Wah, Partial-encryption technique for intellectual property protection of FPGA-Based products, Dec. 15, 1999, IEEE, pp. 183-190.
International Search Report for application No. PCT/US2004/032228.
"A Report on Security Issues in Multimedia" by Gulwani, pp. 10-14, Apr. 30, 2000, Course Notes, Department of Computer Science and Engineering, Indian Institute of Technology Kanpur.
"Ad Agencies and Advertisers to Be Empowered with Targeted Ads Delivered by Television's Prevailing Video Servers" Article Business Section of The New York Times, Updated Thursday, Dec. 20, 2001.
"An Efficient MPEG Video Encryption Algorithm" by Shi and Bhargava, pp. 381-386, 1998 IEEE.
"An Empirical Study of Secure MPEG Video Transmissions" by Agi and Gong, pp. 137-144, 1996, IEEE, Proceedings of SNDSS '96.
"Applying Encryption to Video Communication" by Kunkelmann, pp. 41-47, Sep. 1998, Multimedia and Security Workshop at ACM Multimedia '98. Bristol, U.K.
"Comparison of MPEG Encryption Algorithms" by Qiao and Nahrstedt, Jan. 17, 1998, Preprint submitted to Elsevier Science.
"Coral Consortium Aims to Make DRM Interoperable", by Bill Rosenblatt, Oct. 7, 2004, online at http://www.drmwatch.com/standards/article.php/3418741.
"DVD Demystified—The Guidebook for DVD—Video and DVD-ROM" by Jim Taylor, Pub. McGraw-Hill, 1998, ISBN: 0-07-064841-7, pp. 134-147.
"Dynamic-Customized TV Advertising Creation and Production Tools" by SeaChange International, Web Site Literature.
"Efficient Frequency Domain Video Scrambling for Content Access Control" by Zeng and Lei, Nov. 1999, In Proc. ACM Multimedia.
"Evaluation of Selective Encryption Techniques for Secure Transmission of MPEG-Compressed Bit-Streams" by Alattar and Al-Regib, pp. IV-340 to IV-343, 1999, IEEE.
"Fast Encryption Methods for Audiovisual Data Confidentiality" by Wu and Kuo, Nov. 2000, SPIE International Symposia on Information Technologies 2000, (Boston, Ma., USA).
"Improved Selective Encryption Techniques for Secure Transmission of MPEG Video Bit-Streams" by Alattar, Al-Regib and Al-Semari, pp. 256-260, 1999, IEEE.
Metro Media™ PVR-DVD-MP3-Web—Internet publication from www.metrolink.com, undated.
"Multimedia and Security Workshop at ACM Multimedia" '98. Bristol, U.K., Sep. 1998.
"Passage™, Freedom to Choose", 2003, Sony Electronics Inc.
"Performance Study of a Selective Encryption Scheme for the Security of Networked, Real-Time Video" by Spanos and Maples, pp. 2-10, 1995, IEEE.
"Pre-Encryption Profiles—Concept Overview and Proposal", Rev. 1.2 as submitted to the Open CAS consortium on Dec. 28, 2000.

"Run-Time Performance Evaluation for a Secure MPEG System Supporting Both Selective Watermarking and Encryption" by Wu and Wu, Mar. 1, 1997, submitted to JSAC special issue on Copyright and Privacy Protection.
"Selective Encryption and Watermarking of MPEG Video (Extended Abstract)" by Wu and Wu, Feb. 17, 1997, submitted to International Conference on Image Science, Systems, and Technology, CISST'97.
"The Long March To Interoperable Digital Rights Management" by Koenen et al., pp. 1-17, 2004, IEEE.
"Transport Streams Insertion of Video in the Compressed Digital Domain" by SeaChange International, Web Site Literature, 2000.
"Visible World—A High Impact Approach to Customized Television Advertising" by Haberman, Dec. 2001.
Anonymous, Message Authentication with Partial Encryption, Research discosure RD 296086, Dec. 10, 1998.
McCormac Hack Over Cablemodem, HackWatchAug. 10, 1998.
Anonymous, New Digital Copy Protection Proposal Would Secure Authorized Copies, PR Newswire, Nov. 1998, pp. 1-3.
Aravind, H., et al., "Image and Video Coding Standards", AT&T Technical Journal, (Jan./Feb. 1993),67-68.
Gonzalez, R. C., et al., "Digital Image Processing", Addison Wesley Publishing Company, Inc., (1992),346-348.
Kim, et al., "Bit Rate Reduction Algorithm for a Digital VCR", IEEE Transactions on Consumer Electronics, vol. 37, No. 3, (Aug. 1, 1992),267-274.
Kondo, et al., "A New Concealment Method for Digital VCRs", IEEE Visual Signal Processing and Communication, Melbourne, Australia,(Sep. 1993),20-22.
Kondo, et al., "Adaptive Dynamic Range Coding Scheme for Future Consumer Digital VTR", 219-226.
Kondo, et at, "Adaptive Dynamic Range Coding Scheme for Future HDTV Digital VTR", Sony Corporation, (1991).
Lakshiminath, et al., "A Dual Protocol for Scalable Secure Multicasting", 1999 International Symposium on Computers and Communication, Jul. 6-8, 1999.
Lookabaugh et al., "Selective Encryption and MPEG-2", ACM Multimedia'03, Nov. 2003.
Menezes, Alfred J., et al., "Handbook of Applied Cryptography", CRC Press, 551-553.
NHK Laboratories Note, "Error Correction, Concealment and Shuffling", No. 424, (Mar. 1994),29-44.
Park, et al., "A Simple Concealment for ATM Bursty Cell Loss", IEEE Transactions on Consumer Electronics, No. 3, (Aug. 1993),704-709.
Robert et al., "Digital Cable: The Key to Your Content", Access Intelligence's Cable Group, Feb. 2002, online at http:www.cableworld.com/ct/archives/0202/0202digitalrights.htm.
Tom, et al., "Packet Video for Cell Loss Protection Using Deinterleaving and Scrambling", ICASSP 91: 1991 International Conference on Acoustics, Speech and Signal Processing, vol. 4, (Apr. 1991),2857-2860.
Zhu, et al., "Coding and Cell-Loss Recovery in DCT-Based Packet Video", IEEE Transactions on Circuits and Systems for Video Technology, No. 3, NY,(Jun. 3, 1993).
"ClearPlay: The Technology of Choice", from web site, ClearPlay 2001-2003.

\* cited by examiner

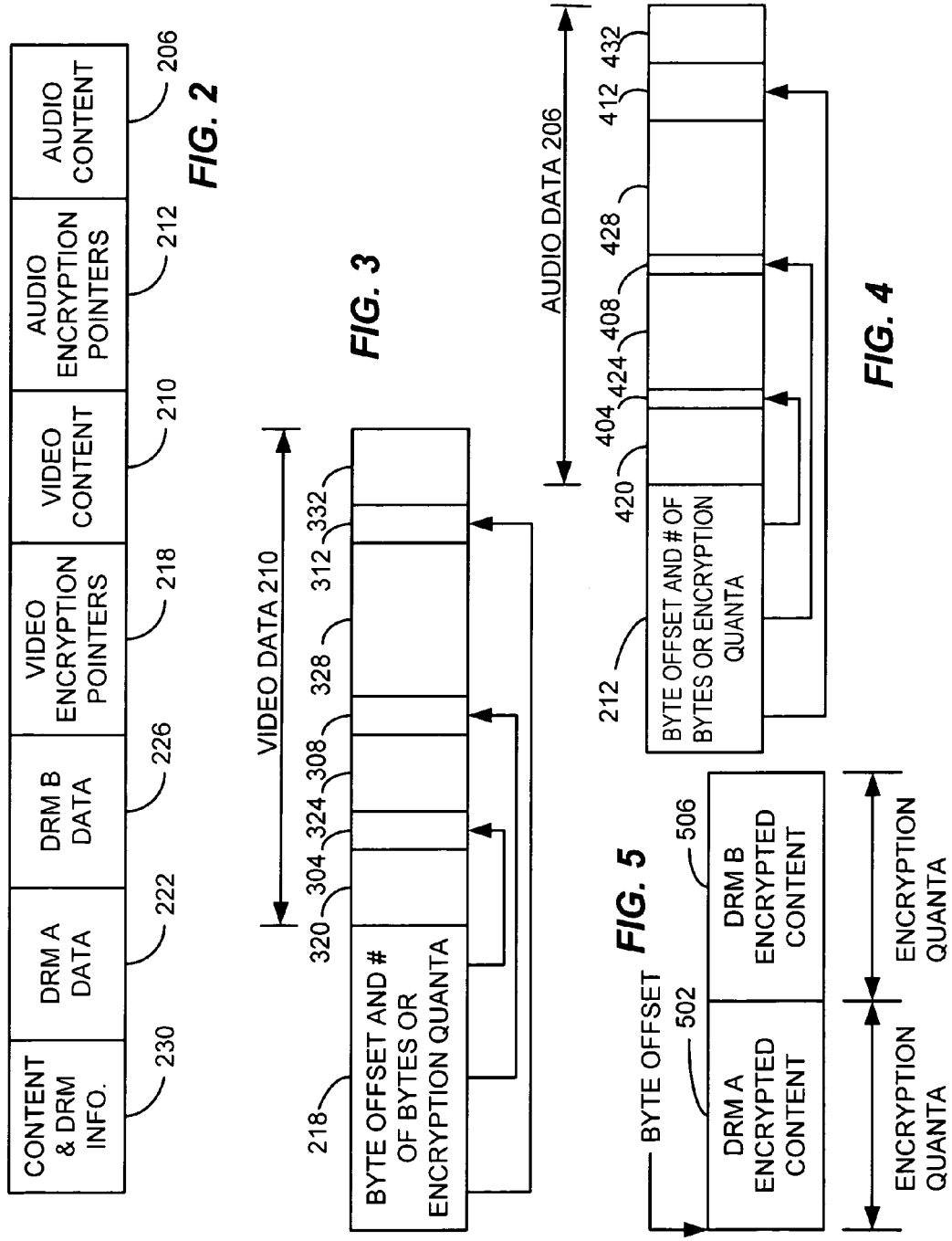

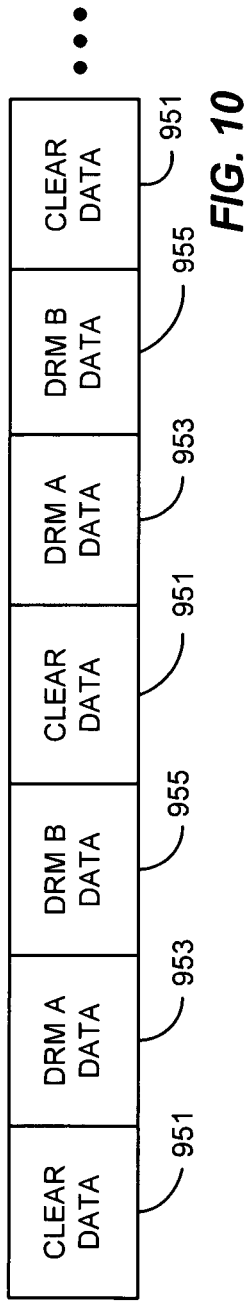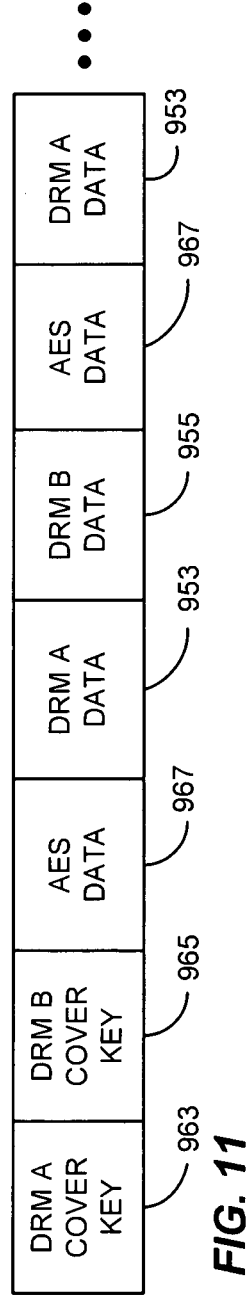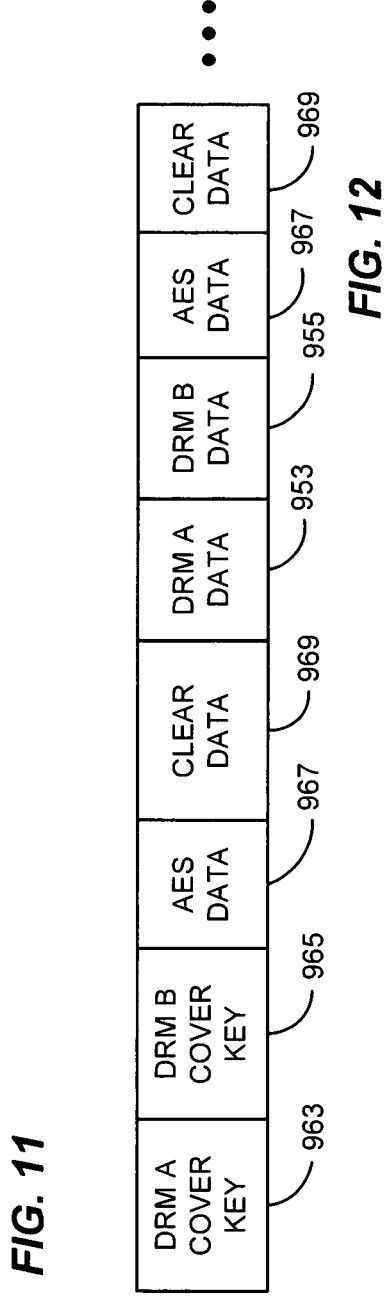

SELECTIVE ENCRYPTION WITH COVERAGE ENCRYPTION

CROSS REFERENCE TO RELATED DOCUMENTS

This application is a continuation-in-part of and claims priority benefit of U.S. patent application Ser. No. 10/318,782, filed Dec. 13, 2002 now U.S. Pat. No. 7,120,250 which claims priority benefit of U.S. Provisional patent application Ser. No. 60/409,675, filed Sep. 9, 2002, entitled "Generic PID Remapping for Content Replacement", to Candelore; this application also claims priority benefit of U.S. Provisional Patent Application Ser. No. 60/659,770, filed Mar. 9, 2005, entitled "Selective Encryption with Coverage Key". The above applications are hereby incorporated by reference herein. This application is also related to patent applications entitled "Critical Packet Partial Encryption" to Unger et al., Ser. No. 10/038,217; entitled "Time Division Partial Encryption" to Candelore et al., Ser. No. 10/038,032; entitled "Elementary Stream Partial Encryption" to Candelore, Ser. No. 10/037,914; entitled "Partial Encryption and PID Mapping" to Unger et al., Ser. No. 10/037,499; and entitled "Decoding and Decrypting of Partially Encrypted Information" to Unger et al., Ser. No. 10/037,498 all of which were filed on Jan. 2, 2002 and are hereby incorporated by reference herein. This application is also related to U.S. patent application Ser. No. 10/273,905, filed Oct. 18, 2002 to Candelore et al. entitled "Video Slice and Active Region Based Dual Partial Encryption", Ser. No. 10/273,903, filed Oct. 18, 2002 to Candelore et al. entitled "Star Pattern Partial Encryption"; Ser. No. 10/274,084, filed Oct. 18, 2002 to Candelore et al. entitled "Slice Mask and Moat Pattern Partial Encryption", and Ser. No. 10/274,019, filed Oct. 18, 2002 to Candelore et al. entitled "Video Scene Change Detection", and U.S. patent application Ser. No. 10/391,940, filed Mar. 19, 2003, published as U.S. Published Patent Application Number US2004/0049691-A1, Published Mar. 11, 2004, entitled "Selective Encryption To Enable Trick Play", to Candelore et al., each of which are hereby incorporated by reference in their entirety. This application is also related to U.S. patent application Ser. No. 10/319,066 filed Dec. 13, 2002 and published as U.S. Published Patent Application Number US2003/0174837 A1, published on Sep. 18, 2003 to Candelore, et al. which is hereby incorporated by reference in its entirety.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND OF THE INVENTION

In traditional distribution of audio and/or video content such as music and movies, rights to copyrighted works are managed by the ownership of the physical medium containing the work. Ownership of the medium provides a limited barrier to unauthorized use. While piracy was and is prevalent with such traditional "packaged media", the problems are dramatically multiplied in an environment of digital distribution of content. The owners of the content have devised various ways to help protect such content that have been collectively termed digital rights management (DRM). DRM encompasses not only the numerous encryption schemes that have been employed to protect the content, but also encompasses the various arrangements for permitting use of the content that have been created, as well as the monitoring and tracking of the rights to the content.

Several forms of DRM are currently in place in the marketplace. Perhaps the most dominant DRM forms a part of the Microsoft Windows® operating system's Media Player, and is referred to as "Janus™". It is widely used by various service providers such as MovieLink™. The MovieLink™ service downloads movies that play on desktop or laptop PCs. Another widely used DRM arrangement is known as FairPlay™. It is used by Apple Computer Corporation's iTunes™ music service. It is used by Apple™ personal computers and iPod™ music players. DRM solutions are typically software based, and consequently, the DRM solutions are designed to detect software tampering and to obfuscate the operation of the executing software.

The above two examples of DRM are but two of an ever growing and evolving field of technology. Further DRM incarnations can be anticipated on a continuing basis to provide greater protection for the content against those who would illegally pirate the content. Each will bring proprietary techniques to protecting the content.

Unfortunately, due to the multiple types of DRM that are available, customers may have to either acquire multiple sets of software (or plug-ins) that support the various DRM scenarios, or limit consumption of content to those DRMs which are supported by their computer, portable devices or other playback devices.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

FIG. 2 illustrates an exemplary file structure consistent with certain embodiments of the present invention.

FIG. 3 illustrates a byte offset arrangement for video data consistent with certain embodiments of the present invention.

FIG. 4 illustrates a byte offset arrangement for audio data consistent with certain embodiments of the present invention.

FIG. 5 illustrates an exemplary DRM arrangement within video or audio data content consistent with certain embodiments of the present invention.

FIG. 10 illustrates a dual selectively encrypted data stream using two DRM encryption arrangements, A and B, consistent with certain embodiments of the present invention.

FIG. 11 illustrates a dual selectively encrypted data stream using two DRM encryption arrangements, A and B, with a coverage key used to encrypt non-critical data in a manner consistent with certain embodiments of the present invention.

FIG. 12 illustrates a dual selectively encrypted data stream using two DRM encryption arrangements, A and B, with a coverage key used to encrypt a portion of the non-critical data while other portions of the non-critical data remain in the clear, in a manner consistent with certain embodiments of the present invention.

DETAILED DESCRIPTION OF THE INVENTION

Figure 1:
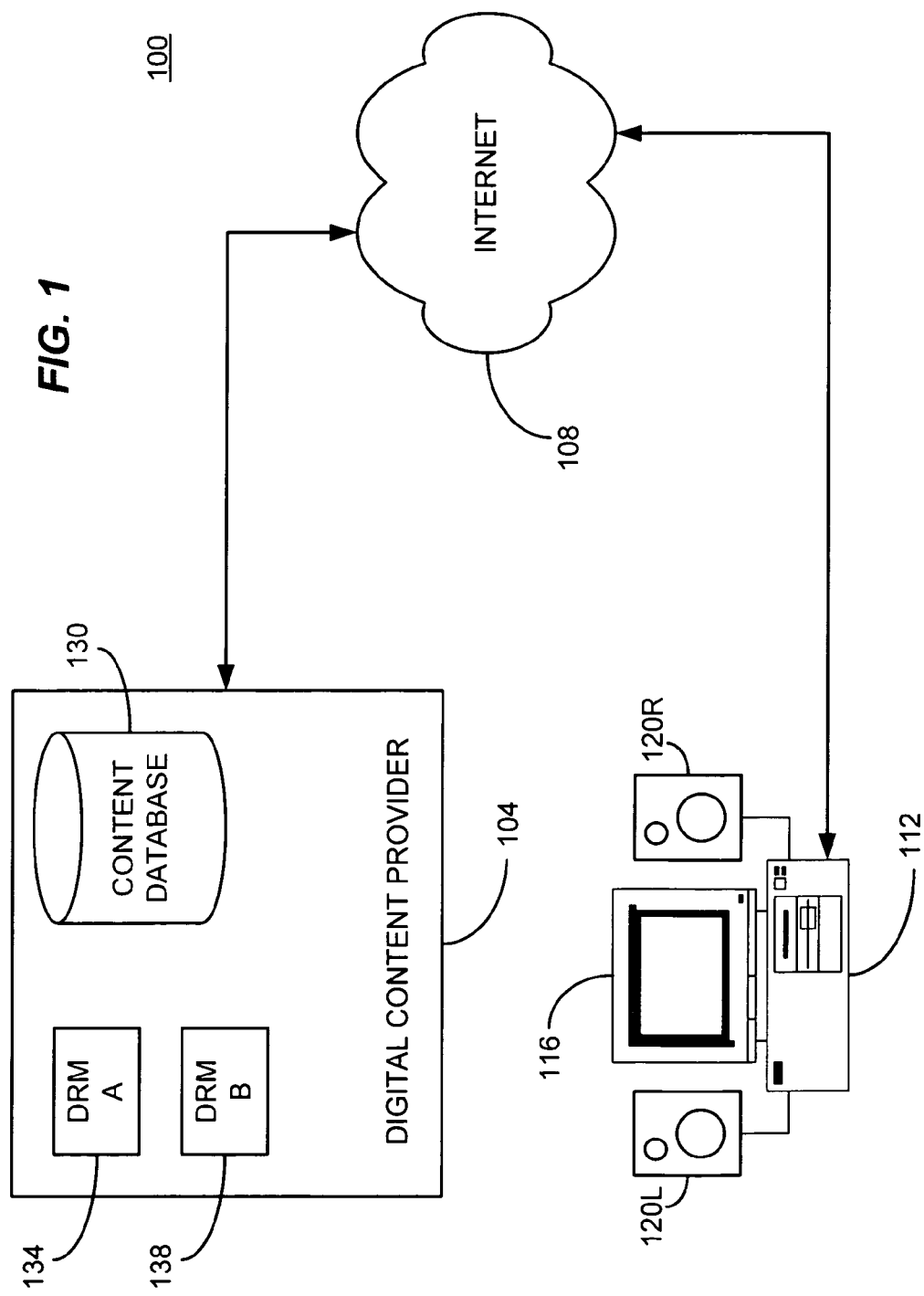
FIG. 1 is a block diagram of an digital content distribution system including digital rights management consistent with certain embodiments of the present invention.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The terms "scramble" and "encrypt" and variations thereof are used synonymously herein. The term "video" is often used herein to embrace not only true visual information, but also in the conversational sense (e.g., "video tape recorder") to embrace not only video signals but associated audio and data. The present document generally uses the example of a "dual selective encryption" embodiment, but those skilled in the art will recognize that the present invention can be utilized to realize multiple partial encryption without departing from the invention. The terms Digital Rights Management and Conditional Access are used synonymously herein—the former being a more capable version of the later. The terms "partial encryption" and "selective encryption" are used synonymously herein.

For purposes of this document, the following definitions are also provided:

Digital Rights Management (DRM)—Similar to legacy Conditional Access (CA) technologies used with broadcast streams in assuring that only authorized users get access to the content. Typically, a DRM remains involved with content after purchase in order to protect copyrights (for example, by limiting the number of copies that can be made or otherwise imposing usage rules) and prevent illegal distribution. A number of technologies are used in DRM including, but not limited to, encryption and digital watermarking. DRM encompasses not only the numerous encryption schemes that have been employed to protect the content, but also encompasses the various arrangements for permitting use of the content that have been created, as well as the monitoring and tracking of the rights to the content.

Critical Packet—A packet that, when encrypted, renders a portion of a video image difficult or impossible to view if not properly decrypted, or which renders a portion of audio difficult or impossible to hear or understand if not properly decrypted. The term "critical" should not be interpreted as an absolute term, in that it may be possible to hack an elementary stream to overcome encryption of a "critical packet", but when subjected to normal decoding, the inability to fully or properly decode such a "critical packet" would inhibit normal viewing or listening of the program content. Such "critical" packets are selected in accordance with a selection rule or algorithm.

Selective Encryption (or Partial Encryption)—encryption of only selected portions of an elementary stream in order to render the stream difficult or impossible to use (i.e., view or hear).

Dual Selective Encryption—encryption of portions of a single selection of content under two separate encryption systems.

Multiple Selective Encryption—encryption of portions of a single selection of content under more than one separate encryption systems.

Passage™—Trademark of Sony Electronics Inc. for various single and multiple selective encryption systems, devices and processes including those used for digital rights management arrangements.

Insertion Mode—packets with a secondary PID are replaced by packets with a primary PID. This function is more fully described in detail in U.S. patent application Ser. No. 10/319,066 filed Dec. 13, 2002 and published as U.S. Published Patent Application Number US2003/0174837 A1, published on Sep. 18, 2003 which is hereby incorporated by reference in its entirety.

Substitution Mode—one-for-one substitution of a packet marked with a secondary PID for one marked with a primary PID. This function is more fully described in detail in U.S. patent application Ser. No. 10/319,066 filed Dec. 13, 2002 and published as U.S. Published Patent Application Number US2003/0174837 A1, published on Sep. 18, 2003 which is hereby incorporated by reference in its entirety.

The above-referenced commonly owned patent applications as listed in the "Cross Reference To Related Documents" and elsewhere herein describe inventions relating to various aspects of methods generally referred to herein as partial encryption or selective encryption. More particularly, systems are described wherein selected portions of a particular selection of digital content are encrypted using two (or more) encryption techniques while other portions of the content are left unencrypted. By properly selecting the portions to be encrypted, the content can effectively be encrypted for use under multiple decryption systems without the necessity of encryption of the entire selection of content. In some embodiments, only a few percent of data overhead is needed to effectively encrypt the content using multiple encryption systems. This results in a cable or satellite system being able to utilize set-top boxes or other implementations of conditional access (CA) receivers from multiple manufacturers in a single system—thus freeing the cable or satellite company to competitively shop for providers of set-top boxes.

Certain embodiments consistent with the present invention apply similar selective encryption techniques to the problem of multiple digital rights management. These techniques may also be applied to broadcast streams. The partial encryption or selective encryption processes described in the above patent applications utilize any suitable encryption method. However, these encryption techniques are selectively applied to the data stream, rather than encrypting the entire data stream, using techniques described in the above-referenced patent applications. In general, but without the intent to be limiting, the selective encryption process utilizes intelligent selection of information to encrypt so that the entire program does not have to undergo dual encryption. By appropriate selection of data to encrypt, the program material can be effectively scrambled and hidden from those who desire to hack into the system and illegally recover commercial content without paying. MPEG (or similar format) data that are used to represent the audio and video data does so using a high degree of reliance on the redundancy of information from frame to frame. Certain data can be transmitted as "anchor" data representing chrominance and luminance data. That data is then often simply moved about the screen to generate subsequent frames by sending motion vectors that describe the movement of the block. Changes in the chrominance and luminance data are also encoded as changes rather than a recoding of absolute anchor data. Thus, encryption of this anchor data, for example, or other key data can effectively render the video un-viewable.

Certain embodiments consistent with the present invention enable a second (or multiple) Digital Rights Management (DRM) solution by duplicating and encrypting content important or critical for decoding the rest of the content with the first and second DRMs. The duplication of content need not add a major increase in bandwidth overhead. Unlike terrestrial and satellite broadcast streams, content delivered and eventually decrypted by a PC over the Internet does not have to be restricted to 188 byte packets. For terrestrial and satellite transport streams, hardware decryption is usually performed on per packet basis based on the scrambling bits in the transport header. Content decryption done in software can be much more granular and selective.

In accordance with certain embodiments consistent with the present invention, the selected video data to be encrypted may be any individual one or combination of the following (described in greater detail in the above applications): video slice headers appearing in an active region of a video frame, data representing an active region of a video frame, data in a star pattern within the video frame, data representing scene changes, I Frame packets, packets containing motion vectors in a first P frame following an I Frame, packets having an intra_slice_flag indicator set, packets having an intra_slice indicator set, packets containing an intra_coded macroblock, data for a slice containing an intra_coded macroblock, data from a first macroblock following the video slice header, packets containing video slice headers, anchor data, and P Frame data for progressively refreshed video data, data arranged in vertical and or horizontal moat patterns on the video frame, and any other selected data that renders the video and/or audio difficult to utilize. Several such techniques as well as others are disclosed in the above-referenced patent applications, any of which (or other techniques) can be utilized with the present invention to encrypt only a portion of the content.

Referring now to FIG. 1, a content delivery system 100 consistent with certain embodiments of the present invention is illustrated. In this system, a digital content provider 104 provides content such as audio or video content to a customer over the Internet for delivery to the customer's personal computer system 112, e.g., by downloading or streaming. Computer system 112 may, for example, be a multimedia computer system having a video display 116 and a stereo (or other) multi-channel) audio system that drives a set of speakers such as speakers 120L and 120R. The personal computer 112 operates using any suitable operating system and incorporates one or more software programs for playback of the audio and/or video content (hereinafter, a "media player").

The digital content provider may operate as an addressable web site that serves as an online distributor of content. In this example, the web site is shown to have a content database 130 that stores content which can be purchased under various terms by customers having computers such as 112 connected to the Internet. To provide a simplified example, without intent to limit the scope of the present invention, digital content provider 104 is depicted as having the ability to supply content using two digital rights management systems—DRM A shown as 134 and DRM B shown as 138. In a conventional digital content provider scenario, only a single DRM system is used and content is stored in encrypted form using the encryption scenario for that particular DRM system.

In accordance with certain embodiments consistent with the present invention, content stored in the content database 130 is stored with dual (in general multiple) selective encryption consistent with the content provider's dual (multiple) DRMs. In this manner, the digital content provider 104 is not burdened with the requirement and cost associated with storage of the content separately under multiple DRMs. Nor is the computing power required to dynamically encrypt the content using a specified DRM at the time of purchase.

Content can be arranged for delivery to the customer as a file similar to that depicted in FIG. 2. In this file structure, the file delivered to the customer is stored with selected portions multiply encrypted. In one example, not intended to be limiting, if the content is stored as MPEG data, one can encrypt all of the MPEG I frames or video slice headers to achieve a substantial level of encryption without need to encrypt the entire file. Any other suitable selective encryption arrangement can also be used without limitation. Once a selected portion of the audio and/or video is selected for encryption, the selected portions are duplicated and encrypted. In this example, the selected portions are encrypted under an encryption arrangement consistent with DRM A in one case and consistent with DRM B in the other. The content is then reassembled with the duplicated encrypted content replacing the original clear content. (Note that in other scenarios, content can be stored encrypted or unencrypted and the file processed and constructed for delivery to the customer "on the fly".)

In this example of Audio/Video content, the content is stored as audio content 206 and video content 210. The file further contains a set of audio encryption pointers 212 that point to the selected portions of the audio content that are encrypted. Similarly, the file further contains a set of video encryption pointers 218 that point to the selected portions of the video content that are encrypted. DRM A data section 222 provides data that the decoder uses to decode the content encrypted using the encryption scheme of DRM A. Similarly, DRM B data section 226 provides data that the decoder uses to decode the content encrypted using the encryption scheme of DRM B. An identification section 230 identifies the content and the DRM schemes available in the file.

The relationship between the video data 210 and video encryption pointers 218 is illustrated in FIG. 3. Pointers are stored that point to encrypted portions of the video data in the file. Such encrypted portions are shown as 304, 308 and 312. Such encrypted portions are interspersed with portions of data stored unencrypted (in the clear) shown as 320, 324, 328 and 332. Of course this illustration is quite simplified since only a small number of encrypted segments are shown compared to the likely large number of encrypted segments. In this illustration, each encrypted segment is illustrated to be the same size (i.e., the encryption quanta), but this is not to be interpreted as limiting.

The relationship between the audio data 206 and audio encryption pointers 212 is similar and illustrated in FIG. 4. Pointers are stored that point to encrypted portions of the audio data in the file. Such encrypted portions are shown as 404, 408 and 412. Such encrypted portions are interspersed with portions of data stored unencrypted shown as 420, 424, 428 and 432. Again, this illustration is quite simplified since only a small number of encrypted segments are shown compared to the likely large number of encrypted segments. In this illustration, the encrypted segments are shown as differing in size, which can be achieved by specifying the length of each encrypted segment.

In each case, the number of bytes to be encrypted can be predefined if desired as the encryption quanta so that the encryption pointers can be simply a sequence of memory offset locations. The amount of data encrypted is then determined by a preset encryption quanta (e.g., 8 bytes). In other embodiments, the encryption pointer section can include not only a starting offset but also an ending offset or a starting offset and a number of bytes.

FIG. 5 depicts an exemplary section of encrypted content with the byte offset location illustrated at the beginning of the section of encrypted content. The next segment of data is DRM A encrypted content 502 that lasts for a duration determined by the encryption quanta (either predefined or encoded in the encryption pointers). The next segment of encrypted content 506 is encrypted under DMA B's encryption scheme and lasts for a duration again defined by the encryption quanta. By using a predefined encryption quanta, the encryption pointers are simplified. By specifying the size of the encrypted segment, the size can be varied to achieve a more flexible encryption scheme, at the sacrifice of efficiency in the encryption pointers. Note that in the case of a predefined encryption quanta, multiple consecutive segments can be encrypted to achieve the effect of longer segments of encrypted content.

DRMs typically verify that the consumer has paid for viewing the content. Viewing may be granted for a period of time or on a viewing event. When a customer makes a payment, this act enables decryption of the content, often as a result of delivery of a decryption key to the customer to enable decryption. In order to enable two or more DRMs to work side-by-side, there should be a clear separation between the payment and key management operation and the content decryption operation. The media player should allow selection of either DRM. By use of selective encryption, most of the content can be sent in the clear with only certain critical or important content (e.g., that needed to decompress or decode the rest of the content) sent encrypted. The critical or important content is duplicated; and one set of the content is encrypted under one DRM, while the other, is encrypted under the other DRM.

Movies and music delivered over the Internet can be packetized in UDP packets for delivery over IP networks. Once re-assembled in the PC, the file can be essentially flat. Both the video and audio can be large packetized elementary stream (PES) files.

In order to realize certain embodiments of the present invention, there should be agreement as to how a media player identifies content that is encrypted. In certain embodiments, the encryption quanta, if utilized, should be standardized, or there should be agreement on the least common denominator. Granularity of encryption should be standardized. These matters, however, are more properly the subject of standardization negotiations and are not important to the understanding of the concepts and principles governing the present invention.

Figure 6:
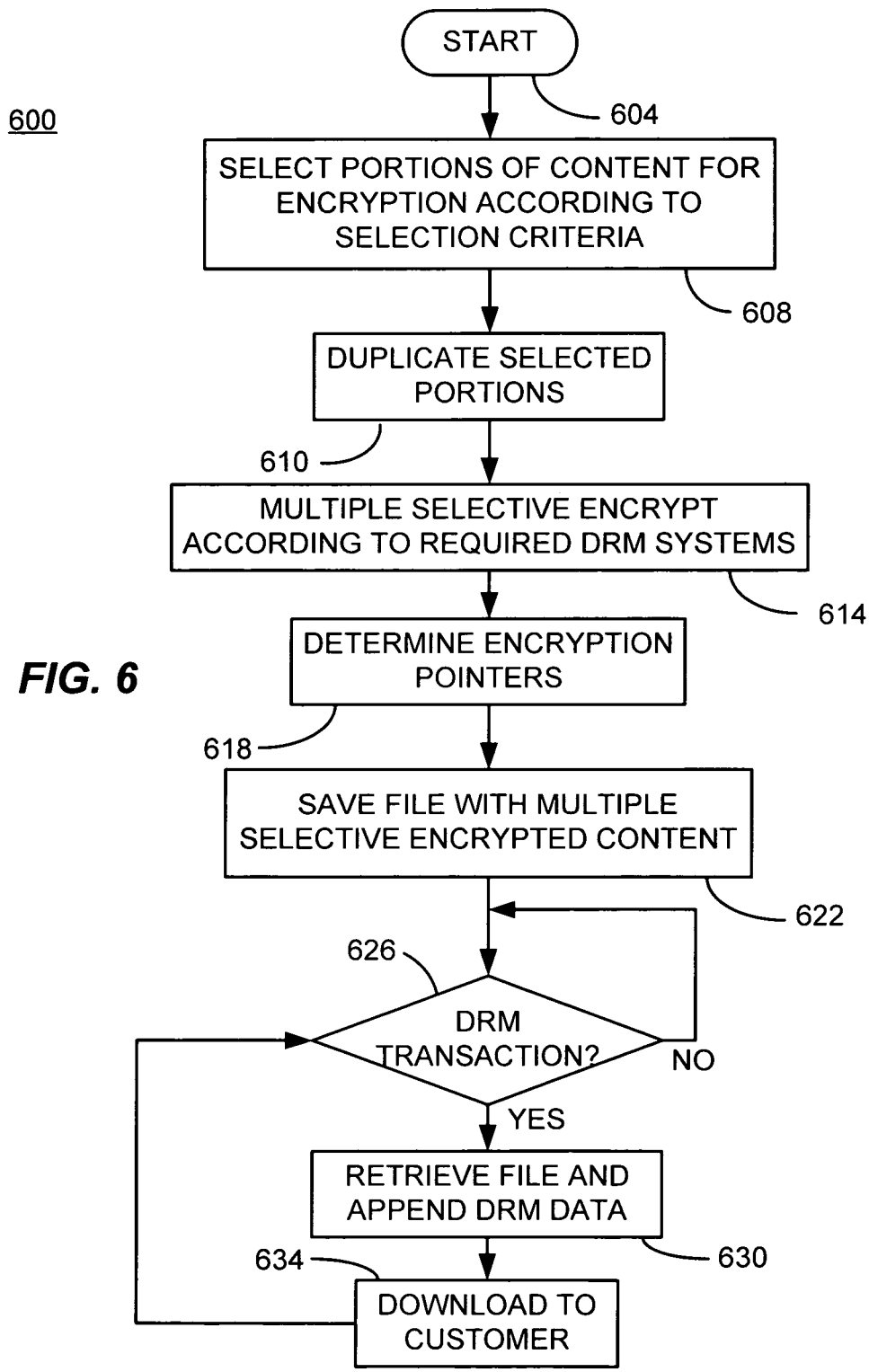
FIG. 6 is a flow chart showing a method for encoding content with multiple DRMs consistent with certain embodiments of the present invention.

The files described above can be created using any of a number of processes. Moreover, the file structure shown, although illustrated for audio/video content, can be readily adapted to audio only by omission of the video encryption pointers and video content. One process for creation of such files is depicted in FIG. 6 as process 600 starting at 604. At 608, a selection criterion is employed to select segments of content to be multiple selectively encrypted. The selection criterion used can be any of those described above, described in the above-referenced patent applications, described elsewhere or newly created without limitation. Once the segments of content are selected, they are duplicated as many times as there are DRM systems to be employed at 610. For example, in the digital content provider 104, one set of duplicate selected data is created.

The selected content is then multiple encrypted such that each of the duplicate sets of selected data is encrypted under the encryption scheme for each of the DRMs at 614. In the example of content provider 104, the selected segments of content are duplicated. One set of selected segments is encrypted under DRM A and the duplicate set is encrypted under DRM B. A set of encryption pointers is then created at 618 as offset values and possibly information that determines the size of the encrypted portions and the file can be saved in the content database 130 at 622 until a customer wishes to acquire digital rights to the content. Alternatively, content can be stored in the clear (or encrypted) and the file for delivery to the customer can be created after purchase by the customer.

When a customer purchases rights to the content, a digital rights managed transaction is carried out at 626 in which the customer pays for certain rights. Such rights might include rights to view for a particular time period or number of viewings. Limitations can be imposed on copying, playback machine or other attributes of the DRM during this transaction. When the transaction is complete, the file containing the purchased content is then retrieved from the content database and DRM data defining the purchased rights is appended at 630. The file is then downloaded or streamed to the customer at 634. The customer can then play back the content (either on computer 112 or another playback device) in a manner consistent with the DRM rights acquired in the transaction at 626.

Thus, a method of enabling use of multiple digital rights management scenarios (DRM), consistent with certain embodiments of the present invention involves examining unencrypted data representing digital content to identify at least segments of content for encryption; encrypting the identified segments of content using a first encryption method associated with a first DRM to produce first encrypted segments; encrypting the identified segments of content using a second encryption method associated with a second DRM to produce second encrypted segments; generating first pointers to the first encrypted content; generating second pointers to the second encrypted content; and replacing the identified segments of content with the first encrypted content and the second encrypted content in the digital content, and inserting the first and second pointers to produce a partially encrypted dual DRM enabled file. When digital rights are purchased, DRM data enabling the rights are appended to the file and the file is sent to the customer.

Figure 7:
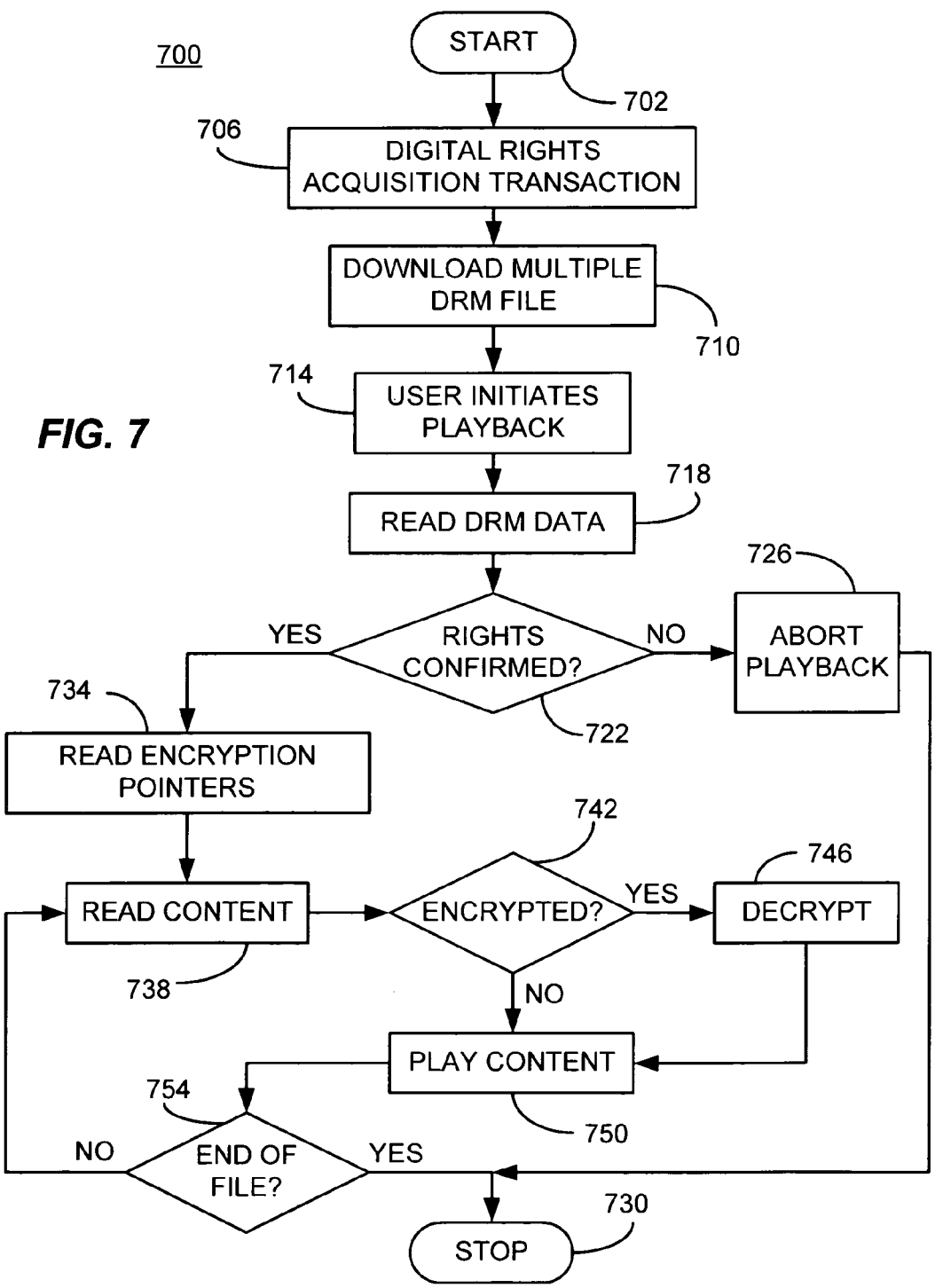
FIG. 7 is a flow chart depicting acquisition and playback of content having multiple DRMs consistent with certain embodiments of the present invention.

A process such as that used by the customer in accordance with certain embodiments consistent with the present invention is illustrated as process 700 of FIG. 7 starting at 702 after which the customer acquires digital rights in content via a digital rights acquisition transaction at 706. The customer can then receive by download or streaming the multiple DRM file at 710. When the customer wishes to initiate playback at 714, the DRM data are read at 718, so that the software on the customer's computer or other playback device can determine if the digital rights acquired by the customer are valid (i.e., not expired or otherwise exhausted). If the software determines that the digital rights have expired or been exhausted at 722, the playback is aborted at 726 and the process ends at 730.

If the customer's digital rights are verified at 722, the software reads the file's encryption pointers at 734 and begins reading the content at 738. If the content is encrypted at 742, it is decrypted at 746 according to the selected DRM scheme being used for playback (dependent upon the playback software and/or playback machine). If the content is unencrypted or decrypted, control passes to 750 where the content is played or buffered for play. If the end of the file has not been reached at 754, control passes back to 738 where a next segment of content is read. When the end of the file is reached at 754, the process stops at 730.

Thus, in accordance with certain embodiments consistent with the present invention, a method of using rights to digital content under one of a plurality of digital rights management scenarios (DRM), involves carrying out a transaction to acquire digital rights to the content; receiving digital content containing: segments of unencrypted content, first encrypted segments of content encrypted using a first encryption method associated with a first DRM, second encrypted segments of content encrypted using a second encryption method associated with a second DRM, first pointers to the first encrypted segments of content; second pointers to the second encrypted segments of content, and DRM data that enables digital rights under at least one of the first DRM and the second DRM; determining that valid digital rights are available from the DRM data; and decrypting one of the first and second encrypted segments to enable playing of the content.

Figure 8:
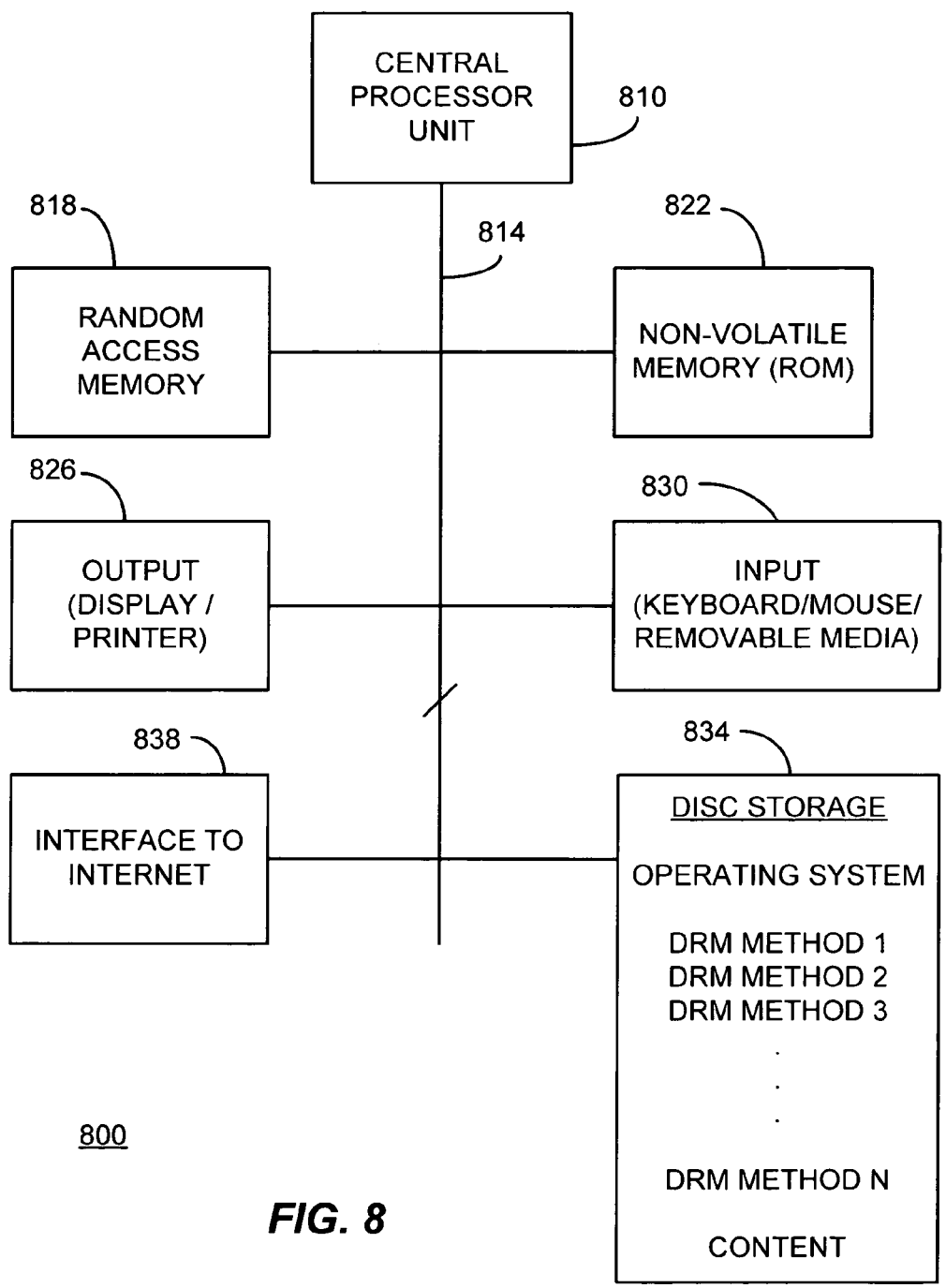
FIG. 8 illustrates a content provider server system consistent with certain embodiments of the present invention.

The process 600 of FIG. 6 can be carried out on any suitable programmed general purpose processor operating as a multiple DRM encoder such as that depicted as computer 800 of FIG. 8. Computer 800 has one or more central processor units (CPU) 810 with one or more associated buses 814 used to connect the central processor unit 810 to Random Access Memory 818 and Non-Volatile Memory 822 in a known manner. Output devices 826, such as a display and printer, are provided in order to display and/or print output for the use of the digital content provider as well as to provide a user interface such as a Graphical User Interface (GUI). Similarly, input devices such as keyboard, mouse and removable media readers 830 may be provided for the input of information by the operator. Computer 800 also incorporates internal and/or external attached disc or other mass storage 834 for storing large amounts of information including, but not limited to, the operating system, multiple DRM encryption methods, as well as the content (which is most likely stored on massive attached storage). The Computer system 800 also has an interface 838 for connection to the Internet to service customer requests for content. While depicted as a single computer, the digital content provider may utilize multiple linked computers to carry out the functions described herein.

Figure 9:
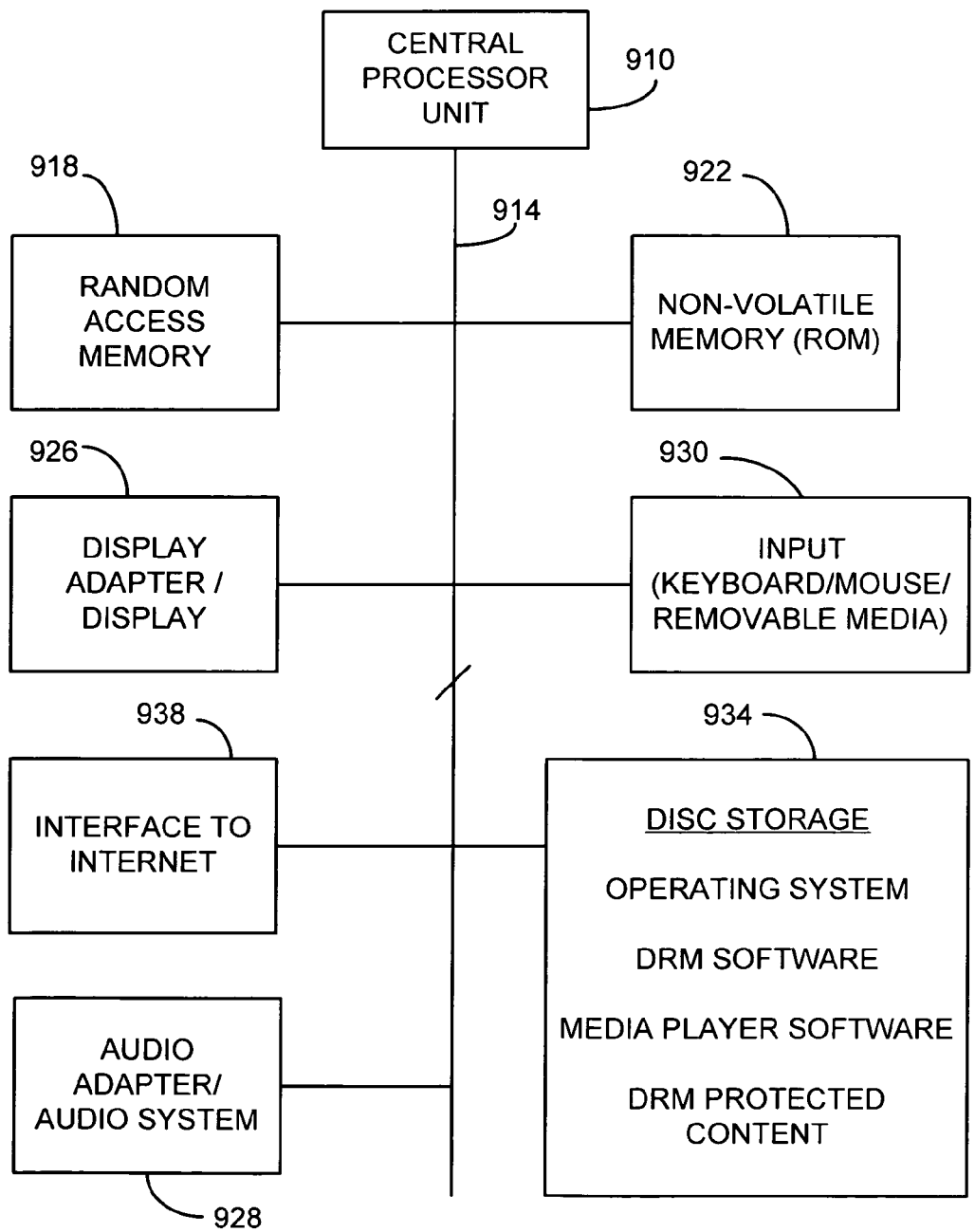
FIG. 9 is a block diagram of a playback computer consistent with certain embodiments of the present invention.

The process 700 of FIG. 7 can be carried out on any suitable programmed general purpose processor operating as a decoder/decrypter and DRM validator such as that depicted as computer 900 of FIG. 9. Computer 900 may be typical of personal computer devices and has a central processor unit (CPU) 910 with one or more associated buses 914 used to connect the central processor unit 910 to Random Access Memory 918 and Non-Volatile Memory 922 in a known manner. Output devices 926, such as a display adapter and display, are provided in order to display output for the use of the customer (possibly including playback of video content) as well as to provide a user interface such as a Graphical User Interface (GUI). An audio adapter and audio system 928 may also be attached for playback of audio or audio/video content. Similarly, input devices such as keyboard, mouse and removable media readers 930 may be provided for the input of information by the operator. Computer 900 also incorporates internal and/or external attached disc or other mass storage 934 for storing large amounts of information including, but not limited to, the operating system, DRM validation and decryption software, media player software as well as the downloaded content. The Computer system 900 also has an interface 938 for connection to the Internet, e.g. to purchase content.

Coverage Key Systems

The distribution of even a portion of content in the form of clear, unencrypted packets may be undesirable in certain instances, for example without limitation, in satellite broadcasts and Internet communication scenarios. In such instances, the delivery of a "coverage key" for encrypting the non-critical packets and "Insertion Mode" can be used instead of "Substitution Mode". The coverage key can be shared by each CA system (e.g. NDS and Nagra). In a broadcast system, the manner in which the coverage key can be shared, in one embodiment, would be similar if not exactly the same as how Simulcrypt™ shares keys. With Insertion Mode, each of the independently encrypted packets are marked with a separate PID different from the non-critical packets. The Insertion packets are equivalent (so there is no primary and secondary packet concept, as with other selective encryption schemes). Thus, the coverage key would not generally be used to encrypt the critical packets. Of course, other schemes are also possible upon consideration of the present teachings.

This technique can be used to multiple-DRM encrypt content so that it might be moved from the PC to portable appliances, or otherwise make use of multiple DRM scenarios.

In certain embodiments consistent with the present invention, the "coverage key" is a key associated with an encryption technique used to encrypt some or all of the packets which are not deemed by a packet selection algorithm to be "critical" as described above. Any suitable selection criterion can be utilized. Thus, a stream of packets might have critical packets encrypted under a DRM or CA scheme and non-critical packets that are encrypted using, for example, DES or AES, or DVB CSA encryption or some other encryption algorithm. The coverage key used to encrypt the non-critical packets is itself encrypted using the same encryption scheme or schemes used to encrypt the critical packets. In order to provide some key isolation (from the critical packets and the shared coverage key), a different encryption scheme may be used. In certain embodiments, other packets can be left in the clear (e.g., packets used to quickly carry out trick play modes or for other purposes).

In multiple DRM or CA environments, the coverage key is shared by multiple service provider entities, and the critical packets are multiple selectively encrypted under multiple DRM or CA encryption systems. Each of the DRM or CA encryption systems can use its own proprietary ways to encrypt the critical packets. Among other things, these can allow players using a particular DRM to be more fully authenticated. This permits few or no packets to be available in the clear. The coverage key can be a hash function and can incorporate rights or other attributes of a particular DRM system, or could be a fixed hardware or software key.

FIG. 10 illustrates an exemplary dual selectively encrypted data stream using two DRM encryption arrangements, A and B, consistent with certain embodiments of selective DRM encryption. In this case, clear data 951 (e.g., one or more packets) are transmitted in the stream to carry non-critical data. Two copies of the critical data are transmitted encrypted under DRM A and DRM B as data segments (e.g., one or more packets) 953 and 955 respectively.

FIG. 11 illustrates a dual selectively encrypted data stream using two DRM encryption arrangements, A and B, with a coverage key used to encrypt non-critical data in a manner consistent with certain embodiments of the present invention. For purposes of this example, the coverage key is used for AES encryption, but this is not to be considered limiting since any encryption arrangement that can be shared by the two DRM systems can be used without limitation. In this example, the coverage key is encrypted using both DRM A and DRM B and are transmitted in the data stream as data segments 963 and 965. Thus, at the receiver device, the appropriate DRM decryption scheme can be used to retrieve the coverage key. This coverage key can then be used to decrypt the AES (or other encryption scheme) encrypted data 967, which In this example represents one or more non-critical data packets. DRM encrypted critical data are transmitted as in FIG. 10 as packets or other segments of data 953 and 955.

FIG. 12 illustrates another dual selectively encrypted data stream using two DRM encryption arrangements, A and B, with a coverage key used to encrypt a portion of the non-critical data while other portions of the non-critical data remain in the clear, in a manner consistent with certain embodiments of the present invention. Again, in this exemplary embodiment, the coverage key is used for AES encryption, but this is not to be considered limiting since any encryption arrangement that can be shared by the two DRM systems can be used without limitation. In this example, the coverage key is encrypted using both DRM A and DRM B and are transmitted in the data stream as data segments 963 and 965. Thus, at the receiver device, the appropriate DRM decryption scheme can be used to retrieve the coverage key. This coverage key can then be used to decrypt the AES (or other encryption scheme) encrypted data 967, which In this example represents one or more non-critical data packets. DRM encrypted critical data are transmitted as in FIG. 10 as packets or other segments of data 953 and 955. In this example, however, certain of the data (presumably, non-critical data) may be transmitted in the clear as data 969. This can prove useful for purposes of allowing recording or playback equipment to carry out trick play modes of operation. The use of such data, can be identical or similar to that described in U.S. patent application Ser. No. 10/391,940, filed Mar. 19, 2003, published as U.S. Published Patent Application Number US2004/0049691-A1, Published Mar. 11, 2004, entitled "Selective Encryption To Enable Trick Play", to Candelore et al., which is hereby incorporated by reference in its entirety.

In one embodiment, the packets can be distributed using one PID for critical packets of one CA or DRM, another PID for critical packets of another CA or DRM and a third PID for the non-critical packets encrypted under the coverage key. At the receiver, only the non-critical packets and critical packets relevant to the particular DRM of the receiver device are used, and the others discarded.

Figure 13:
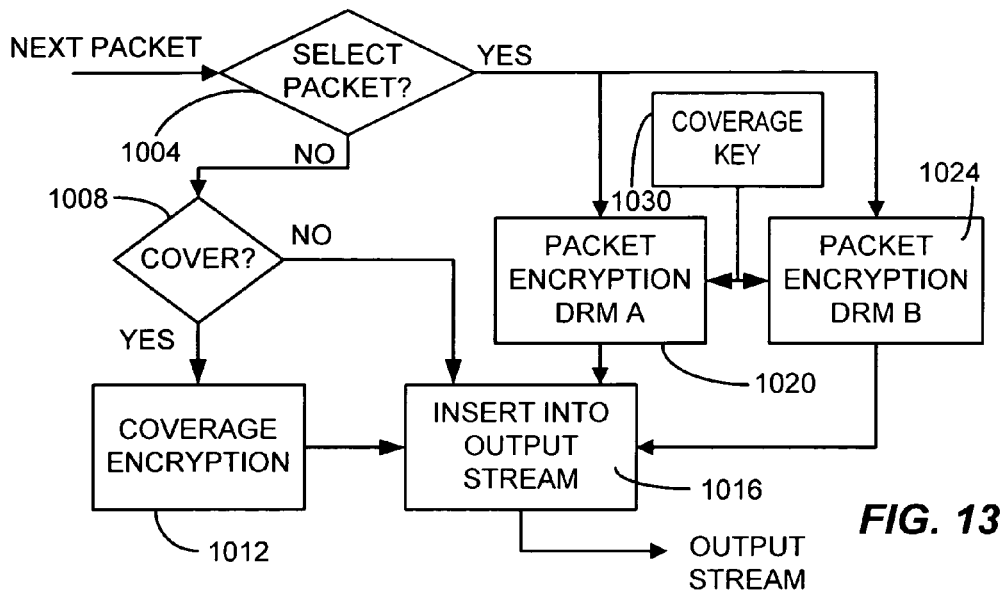
FIG. 13 is a flow chart showing an encryption method for multiple DRMs using a coverage key consistent with certain embodiments of the present invention.

Referring now to FIG. 13, a simplified flow chart depicting dual DRM encryption with a coverage key of a stream of packetized data. When a packet is received at 1004, a selection algorithm determines if it should be considered a "critical" packet (as defined above). If not, the packet is routed to 1008 where a determination is made as to whether or not to encrypt the packet using the coverage key. Is so, the packet is passed to a coverage encryption device 1012 for encryption (the coverage key is assumed for purposes of this illustration to be known to coverage encryption device 1012). The coverage encrypted output is delivered to a multiplexing device 1016 for insertion into the output stream at an appropriate location. In examples such as that of FIG. 12, where certain data are passed without any encryption, that data passes from 1008 directly to 1016 as shown.

If the packet is selected according to the selection algorithm to be a "critical" packet, it is passed to both encryption devices 1020 and 1024 for encryption under DRM A encryption algorithm and DRM B encryption algorithm respectively. The encrypted output of 1020 and 1024 are respectively passed to device 1016 for insertion into the output stream. Additionally, the coverage key itself is passed to devices 1020 and 1024 for encryption under DRM A encryption algorithm and DRM B encryption algorithm respectively. The encrypted coverage keys are then output from 1020 and 1024 respectively to device 1016 for insertion into the output stream.

Figure 14:
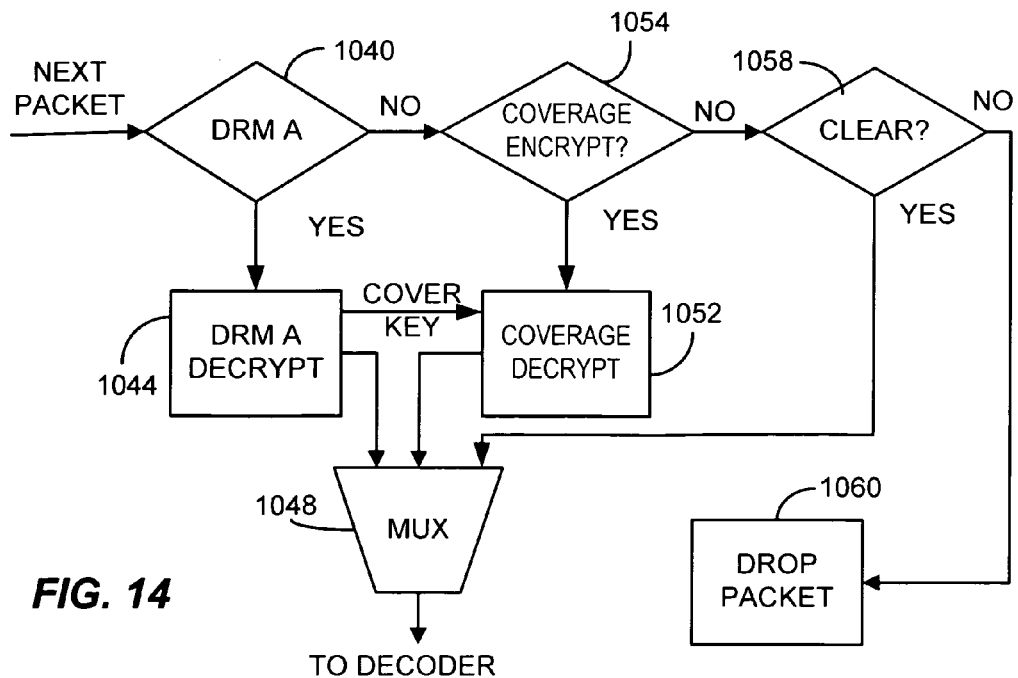
FIG. 14 is a flow chart depicting a receiver operation for receiving an example DRM A encrypted and coverage encrypted signal consistent with certain embodiments of the present invention.

Referring now to FIG. 14, a receiver demultiplexing process is depicted in flow chart form. The illustrated example assumes that the receiver is a DRM A compatible receiver. When a stream of packets is received at 1040, a determination is made as to whether or not the packet is encrypted under DRM A. If so, the DRM A encrypted packet is decrypted at 1044 and then passed to a multiplexer 1048 to form a portion of the output data stream passed to the decoder. If the packet contains a coverage key encrypted under DRM A, the coverage key is passed to coverage decrypter 1052 as shown.

If the packet is not a DRM A encrypted packet, it is examined at 1054 to determine if it is encrypted under the coverage key. If so, it is passed to coverage decrypter 1052 for decryption. The decrypted data are then passed to multiplexer 1048 for recombination into the appropriate data stream for the decoder.

If the packet is clear at 1058 (on systems supporting clear packets) the packet is passed directly to multiplexer 1048 to form a part of the data stream if appropriate. If the data packet is neither DRM A, Coverage encrypted, or clear, the packet is dropped at 1060.

Thus, for IP delivered content, it may not be necessary to "selectively" encrypt. As with other applications of Passage™, the critical data can be uniquely encrypted by each DRM. However, for Internet content or other applications, part of the critical data could contain the common "coverage key" which would be used to encrypt the content that is normally send in the clear. So there is no exposure of clear content, and this arrangement will work equally well with AVC and VC1 (MS format) as MPEG2 or other formats of digital video data.

For broadcasts, the DRM can resemble "link encryption" after content has been CA descrambled. Passage can be used at the broadcast source, not to introduce a second CA, but rather to introduce DRM. Content would be dual encrypted for CA and DRM.

Thus, a method and apparatus for enabling use of multiple digital rights management scenarios (DRM) consistent with certain embodiments has unencrypted data representing digital content which is examined to identify at least segments of content for DRM encryption. The identified segments of content are duplicated and then encrypted using a first encryption method associated with a first DRM to produce first encrypted segments. Duplicates are encrypted using a second encryption method associated with a second DRM to produce second encrypted segments. At least a portion of segments not selected for DRM encryption are encrypted using a coverage encryption method. The coverage encryption key is encrypted by each of the first and second DRM encryption methods.

A method of enabling simultaneous use of multiple digital rights management scenarios (DRM) consistent with certain embodiments involves examining unencrypted data representing input digital content to identify at least segments of content for DRM encryption; encrypting the identified segments of content using a first encryption method associated with a first DRM to produce first DRM encrypted segments; encrypting the identified segments of content using a second encryption method associated with a second DRM to produce second DRM encrypted segments; establishing a coverage key for a coverage encryption method; encrypting the coverage key using a third encryption method associated with the first DRM to produce a first encrypted coverage key; encrypting the coverage key using a fourth encryption method associated with the second DRM to produce a second encrypted coverage key; encrypting at least a portion of the digital content that was not selected for DRM encryption using the coverage encryption method and the coverage key to produce coverage encrypted content; and constructing output digital content comprising the first DRM encrypted segments, the second DRM encrypted segments, the first encrypted coverage key, the second encrypted coverage key, and the coverage encrypted content.

In certain embodiments, the third encryption method and the first encryption method can be the same, while in others they can be different. Similarly, the fourth encryption method and the second encryption method can be the same in certain embodiments, and can be different in others.

An encoder that enables use of multiple digital rights management scenarios (DRM) according to certain embodiments includes a device for examining unencrypted data representing input digital content to identify at least segments of content for DRM encryption. A first encrypter encrypts the identified segments of content using a first encryption method associated with a first DRM to produce first DRM encrypted segments. A second encrypter encrypts the identified segments of content using a second encryption method associated with a second DRM to produce second DRM encrypted segments. A coverage key is established for a coverage encryption method. The first encrypter further encrypts the coverage key using the first encryption method associated with the first DRM to produce a first encrypted coverage key. The second encrypter further encrypts the coverage key using second encryption method associated with the second DRM to produce a second encrypted coverage key. A third encrypter that encrypts at least a portion of the digital content that was not selected for DRM encryption using the coverage encryption method and the coverage key to produce coverage encrypted content. A multiplexing device constructs a output digital content comprising the first DRM encrypted segments, the second DRM encrypted segments, the first encrypted coverage key, the second encrypted coverage key, and the coverage encrypted content.

A decryption method, consistent with certain embodiments involves receiving digital content comprising first DRM (Digital Rights Management) encrypted segments, second DRM encrypted segments, a coverage key encrypted under the first DRM, the coverage key encrypted under the second DRM, the second encrypted coverage key, segments of content encrypted under a coverage encryption system; decrypting the first DRM encrypted segments, to produce decrypted first DRM segments; decrypting the first DRM encrypted coverage key to produce a decrypted coverage key; decrypting the coverage key encrypted segments to produce decrypted coverage segments; multiplexing the decrypted first DRM segments with the decrypted coverage key segments to produce a decrypted output.

A decryption device consistent with certain embodiments has a receiver that receives digital content comprising first DRM (Digital Rights Management) encrypted segments, second DRM encrypted segments, a coverage key encrypted under the first DRM, the coverage key encrypted under the second DRM, the second encrypted coverage key, segments of content encrypted under a coverage encryption system. A first DRM decrypter decrypts the first DRM encrypted segments, to produce decrypted first DRM segments. The first decrypter further decrypts the first DRM encrypted coverage key to produce a decrypted coverage key. A second decrypter decrypts the coverage key encrypted segments to produce decrypted coverage segments. A multiplexing device that combines the decrypted first DRM segments with the decrypted coverage key segments to produce a decrypted output.

A method of using rights to digital content under one of a plurality of digital rights management scenarios (DRM) consistent with certain embodiments involves carrying out a transaction to acquire digital rights to the content; receiving digital content containing: first encrypted segments of content encrypted using a first encryption method associated with a first DRM, second encrypted segments of content encrypted using a second encryption method associated with a second DRM, third encrypted segments of content encrypted using a coverage encryption method; a coverage encryption key encrypted under the first encryption method, the coverage encryption key encrypted under the second encryption method, third encrypted segments of content encrypted using the coverage encryption method, and DRM data that enables digital rights under at least one of the first DRM and the second DRM. The method further entails determining that valid digital rights are available from the DRM data; and decrypting the coverage key using a decryption method associated with one of the first and second DRMs, decrypting the coverage encrypted data to produce decrypted coverage data, decrypting one of the first and second encrypted segments to produce decrypted DRM data, combining the decrypted coverage data with the decrypted DRM data to enable playing of the content.

An encrypted digital content signal that enables use of multiple digital rights management scenarios (DRM) consistent with certain embodiments has first encrypted segments of content encrypted using a first encryption method associated with a first DRM; second encrypted segments of content encrypted using a second encryption method associated with a second DRM; third encrypted segments of content encrypted under a coverage encryption method; a coverage encryption key encrypted under the first encryption method or possibly a third encryption method; the coverage encryption key encrypted under the second encryption method or possibly a fourth encryption method; and a segment of code that enables digital rights under at least one of the first DRM and the second DRM.

Thus, certain embodiments of the present invention provide for a digital content provider to readily supply content under multiple digital rights management schemes without need to fully encrypt the content for each potential DRM system. This permits a reduction in either storage capacity (for storage or multiple fully encrypted copies of content) or processing power (to encrypt on the fly) needed by the digital content provider. By use of embodiments of the present invention, the customer can be afforded a wide range of content without need to purchase or load multiple DRM systems and media players on his or her personal computer since multiple DRMs can be readily accommodated by the content provider at low cost.

Those skilled in the art will recognize that the present invention has been described in terms of exemplary embodiments based upon use of a programmed processor (e.g., computers 800 and 900). However, the invention should not be so limited, since the present invention could be implemented using hardware component equivalents such as special purpose hardware and/or dedicated processors which are equivalents to the invention as described and claimed. Similarly, general purpose computers, microprocessor based computers, micro-controllers, optical computers, analog computers, dedicated processors and/or dedicated hard wired logic may be used to construct alternative equivalent embodiments of the present invention. Moreover, although the present invention has been described in terms of a general purpose personal computer providing a playback mechanism, the playback can be carried on a dedicated machine without departing from the present invention.

Those skilled in the art will appreciate that the program steps and associated data used to implement the embodiments described above can be implemented using disc storage as well as other forms of storage such as for example Read Only Memory (ROM) devices, Random Access Memory (RAM) devices; optical storage elements, magnetic storage elements, magneto-optical storage elements, flash memory, core memory and/or other equivalent storage technologies without departing from the present invention. Such alternative storage devices should be considered equivalents.

The present invention, as described in embodiments herein, is implemented using a programmed processor executing programming instructions that are broadly described above form that can be stored on any suitable electronic storage medium or transmitted over any suitable electronic communication medium or otherwise be present in any computer readable or propagation medium. However, those skilled in the art will appreciate that the processes described above can be implemented in any number of variations and in many suitable programming languages without departing from the present invention. For example, the order of certain operations carried out can often be varied, additional operations can be added or operations can be deleted without departing from the invention. Error trapping can be added and/or enhanced and variations can be made in user interface and information presentation without departing from the present invention. Such variations are contemplated and considered equivalent.

Software code and/or data embodying certain aspects of the present invention may be present in any computer readable medium, transmission medium, storage medium or propagation medium including, but not limited to, electronic storage devices such as those described above, as well as carrier waves, electronic signals, data structures (e.g., trees, linked lists, tables, packets, frames, etc.) optical signals, propagated signals, broadcast signals, transmission media (e.g., circuit connection, cable, twisted pair, fiber optic cables, waveguides, antennas, etc.) and other media that stores, carries or passes the code and/or data. Such media may either store the software code and/or data or serve to transport the code and/or data from one location to another. In the present exemplary embodiments, MPEG compliant packets, slices, tables and other data structures are used, but this should not be considered limiting since other data structures can similarly be used without departing from the present invention.

While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A method, comprising:
    receiving by one or more processors segments of unencrypted data stream of digital content;
    identifying by one or more processors from the received segments, segments for multiple selective DRM encryption based on a critical data selection rule;
    generating by one or more processors first DRM encrypted segments and second DRM encrypted segments by parallel encrypting the identified segments using a first encryption method associated with a first DRM and using a second encryption method associated with a second DRM;
    creating by one or more processors a coverage key for encryption of the received segments that was not identified for multiple selective DRM encryption via a coverage encryption method;
    generating a coverage encrypted content by the one or more processors by encrypting at least portion of the received segments of unencrypted data stream of digital content that was not identified for multiple selective DRM encryption using the coverage encryption method and the coverage key;
    generating by one or more processors a first encrypted key and second encrypted key by parallel encrypting the coverage key using a third encryption method associated with the first DRM and using a fourth encryption method associated with the second DRM;
    constructing by one or more processors an output digital content stream comprising the first DRM encrypted segments, the second DRM encrypted segments, the first encrypted coverage key, the second encrypted coverage key, and the coverage encrypted content; and
    transmitting by the one or more processors, the constructed digital content stream to one or more recipients.

2. The method according to claim 1, wherein the segments of unencrypted data stream of digital content comprises at least one of digitized audio content and digitized video content.

3. The method according to claim 1, wherein the output digital content stream further comprises data to enable digital rights under the first DRM to a file, and data to enable digital rights under the second DRM to the file.

4. The method according to claim 1, wherein the output digital content stream further comprises clear unencrypted data.

5. The method according to claim 1, wherein creating the coverage key comprises using a hash function to create the coverage key.

6. The method according to claim 5, wherein the hash function used to create the coverage key incorporates rights or other attributes of at least one of the first and second DRMs.

7. The method according to claim 1, wherein the coverage key comprises at least one of a fixed hardware key, a fixed software key, and a changing software key.

8. The method according to claim 1, wherein the third encryption method and the first encryption method are the same.

9. The method according to claim 1, wherein the fourth encryption method and the second encryption method are the same.

10. An encoder device that enables use of multiple digital rights management scenarios (DRM), comprising:
one or more processors and a memory connected to said one or more processors, the memory storing instructions that when executed by the one or more processors cause the one or more processors to perform the functions of:
receiving by one or more processors segments of unencrypted data stream of digital content;
identifying by one or more processors from the received segments, segments for multiple selective DRM encryption based on a critical data selection rule;
generating by one or more processors first DRM encrypted segments and second DRM encrypted segments by parallel encrypting the identified segments using a first encryption method associated with a first DRM and using a second encryption method associated with a second DRM;
creating by one or more processors a coverage key for encryption of the received segments that was not identified for multiple selective DRM encryption via a coverage encryption method;
generating a coverage encrypted content by the one or more processors by encrypting at least portion of the received segments of unencrypted data stream of digital content that was not identified for multiple selective DRM encryption using the coverage encryption method and the coverage key;
generating by one or more processors a first encrypted key and second encrypted key by parallel encrypting the coverage key using a third encryption method associated with the first DRM and using a fourth encryption method associated with the second DRM;
constructing by one or more processors an output digital content stream comprising the first DRM encrypted segments, the second DRM encrypted segments, the first encrypted coverage key, the second encrypted coverage key, and the coverage encrypted content; and
transmitting by the one or more processors, the constructed digital content stream to one or more recipients.

11. The encoder device according to claim 10, further comprising:
first and second encryption devices;
wherein generating by one or more processors first DRM encrypted segments and second DRM encrypted segments by parallel encrypting the identified segments using a first encryption method associated with a first DRM and using a second encryption method associated with a second DRM comprises:
the first encryption device generating first DRM encrypted segments using a first DRM encryption method; and
the second encryption device generating second DRM encrypted segments using a second DRM encryption method.

12. The encoder device according to claim 11, wherein the first and second encryption devices comprise hardware encryption devices.

13. The encoder device according to claim 10, further comprising:
a third encryption device;
wherein creating by one or more processors a coverage key for encryption of the received segments that was not identified for multiple selective DRM encryption via a coverage encryption method comprises:
the third encryption device generating a first encrypted key and second encrypted key by parallel encrypting the coverage key using a third encryption method associated with the first DRM and using a fourth encryption method associated with the second DRM.

14. The encoder device according to claim 13, wherein the third encryption device comprises a hardware encryption device.

15. The encoder device according to claim 10, further comprising a multiplexing device that constructs the output digital content stream.

16. The encoder device according to claim 10, wherein the third encryption method and the first encryption method are the same and the fourth encryption method and the second encryption method are the same.

17. The apparatus according to claim 10, wherein the segments of unencrypted data stream of digital content comprises at least one of digitized audio content and digitized video content.

18. The apparatus according to claim 10, wherein the output digital content stream further comprises data enabling digital rights under the first DRM to a file, and data enabling digital rights under the second DRM to the file.

19. The apparatus according to claim 10, wherein the output digital content stream further comprises clear unencrypted data.

20. The apparatus according to claim 10, wherein the one or more processors that create the coverage key use a hash function to generate the coverage key.

21. The apparatus according to claim 20, wherein the hash function used to generate the coverage key incorporates rights or other attributes of at least one of the first and second DRMs.

22. The apparatus according to claim 20, wherein the coverage key comprises at least one of a fixed hardware key and a software key.

23. The apparatus according to claim 10, wherein the third encryption method and the first encryption method are the same.

24. The apparatus according to claim 10, wherein the fourth encryption method and the second encryption method are the same.

25. An encoder device that enables use of multiple digital rights management scenarios (DRM), comprising:
one or more processors and a memory connected to said one or more processors, the memory storing instructions that when executed by the one or more processors cause the one or more processors to perform the functions of:
receiving by one or more processors segments of unencrypted data stream of audio/video (AV) data;
identifying by one or more processors from the received segments, segments for multiple selective DRM encryption based on a critical data selection rule;
generating by one or more processors first DRM encrypted segments and second DRM encrypted segments by parallel encrypting the identified segments using a first encryption method associated with a first DRM and using a second encryption method associated with a second DRM;
creating by one or more processors a coverage key for encryption of the received segments that was not identified for multiple selective DRM encryption via a coverage encryption method;
generating a coverage encrypted content by the one or more processors by encrypting at least a portion of the received segments of unencrypted data stream of digital content that was not identified for multiple selective DRM encryption using the coverage encryption method and the coverage key;

generating by one or more processors a first encrypted key and second encrypted key by parallel encrypting the coverage key using a third encryption method associated with the first DRM and using a fourth encryption method associated with the second DRM;

constructing by one or more processors an output digital content stream comprising the first DRM encrypted segments, the second DRM encrypted segments, the first encrypted coverage key, the second encrypted coverage key, and the coverage encrypted content; and transmitting by the one or more processors, the constructed digital content stream to one or more recipients.

26. The encoder device according to claim 25, further comprising:

first and second encryption devices;

wherein generating by one or more processors first DRM encrypted segments and second DRM encrypted segments by parallel encrypting the identified segments using a first encryption method associated with a first DRM and using a second encryption method associated with a second DRM comprises:

the first encryption device generating first DRM encrypted segments using a first DRM encryption method; and the second encrypter generating second DRM encrypted segments using a second DRM encryption method.

27. The encoder device according to claim 26, wherein the first and second encryption devices comprise hardware encryption devices.

28. The encoder device according to claim 25, further comprising:

a third encryption device;

wherein creating by one or more processors a coverage key for encryption of the received segments that was not identified for multiple selective DRM encryption via a coverage encryption method comprises:

the third encryption device generating a first encrypted key and second encrypted key by parallel encrypting the coverage key using a third encryption method associated with the first DRM and using a fourth encryption method associated with the second DRM.

29. The encoder device according to claim 28, wherein the third encryption device comprises a hardware encryption device.

* * * * *